US012679341B2

(12) United States Patent
Lee et al.

(10) Patent No.: US 12,679,341 B2
(45) Date of Patent: Jul. 14, 2026

(54) VEHICLE FOR PERFORMING MINIMAL RISK MANEUVER AND METHOD FOR OPERATING THE SAME

(71) Applicants: HYUNDAI MOTOR COMPANY, Seoul (KR); Kia Corporation, Seoul (KR)

(72) Inventors: Jong Hyuck Lee, Hwaseong-si (KR); Jong Sung Park, Hwaseong-si (KR); Chan Jong Jang, Hwaseong-si (KR); Young Bin Min, Gwangmyeong-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 173 days.

(21) Appl. No.: 18/034,189

(22) PCT Filed: Oct. 20, 2021

(86) PCT No.: PCT/KR2021/014659
§ 371 (c)(1),
(2) Date: Apr. 27, 2023

(87) PCT Pub. No.: WO2022/092684
PCT Pub. Date: May 5, 2022

(65) Prior Publication Data
US 2023/0399019 A1 Dec. 14, 2023

(30) Foreign Application Priority Data
Oct. 27, 2020 (KR) ........................ 10-2020-0140550

(51) Int. Cl.
B60W 30/08 (2012.01)
B60Q 9/00 (2006.01)
(Continued)

(52) U.S. Cl.
CPC ............. B60W 30/08 (2013.01); B60Q 9/008 (2013.01); B60W 30/09 (2013.01);
(Continued)

(58) Field of Classification Search
None
See application file for complete search history.

(56) References Cited

U.S. PATENT DOCUMENTS

2017/0297565 A1 10/2017 Joyce et al.
2020/0201323 A1* 6/2020 Park ...................... B60W 50/04
(Continued)

FOREIGN PATENT DOCUMENTS

CN 109664882 A 4/2019
CN 111508254 A 8/2020
(Continued)

OTHER PUBLICATIONS

International Search Report issued in corresponding International Application No. PCT/KR2021/014659 dated Jan. 20, 2022, with English translation.
Office Action issued in corresponding Japanese Patent Application No. 2023-525941 dated Jun. 20, 2025, with English translation.
Office Action issued in corresponding Chinese Patent Application No. 202180073764.1 on Mar. 27, 2026, with English translation.

*Primary Examiner* — Christian Chace
*Assistant Examiner* — Shayne M. Gilbertson
(74) *Attorney, Agent, or Firm* — Morgan, Lewis & Bockius LLP

(57) ABSTRACT
Disclosed is a vehicle which supports a minimal risk maneuver. The vehicle performs driving, perform the minimal risk maneuver when a specific event occurs during the driving, eliminates the risk of the vehicle in accordance with the initiation of the minimal risk maneuver, ends the minimal risk maneuver when the risk of the vehicle is eliminated, and performs the driving again after ending the minimal risk maneuver.

12 Claims, 16 Drawing Sheets

(51) Int. Cl.

| | | |
|---|---|---|
| *B60W 30/09* | (2012.01) | |
| *B60W 30/095* | (2012.01) | |
| *B60W 30/18* | (2012.01) | |
| *B60W 40/06* | (2012.01) | |
| *B60W 50/14* | (2020.01) | |
| *B60W 60/00* | (2020.01) | |
| *G08G 1/16* | (2006.01) | |

(52) U.S. Cl.

CPC .. *B60W 30/0956* (2013.01); *B60W 30/18163* (2013.01); *B60W 40/06* (2013.01); *B60W 50/14* (2013.01); *B60W 60/0015* (2020.02); *B60W 60/0053* (2020.02); *B60W 60/0059* (2020.02); *G08G 1/16* (2013.01); *B60W 2552/00* (2020.02); *B60W 2554/80* (2020.02); *B60W 2554/801* (2020.02); *B60W 2554/802* (2020.02); *B60W 2556/50* (2020.02); *B60W 2756/10* (2020.02)

(56) References Cited

U.S. PATENT DOCUMENTS

| | | | | |
|---|---|---|---|---|
| 2020/0307573 | A1* | 10/2020 | Kato | B60W 60/0027 |
| 2020/0307646 | A1* | 10/2020 | Kato | B60W 50/00 |
| 2021/0294336 | A1* | 9/2021 | Maus | G05D 1/0214 |

FOREIGN PATENT DOCUMENTS

| | | | |
|---|---|---|---|
| CN | 111746511 | A | 10/2020 |
| JP | 2015-230552 | A | 12/2015 |
| JP | 2019-038421 | A | 3/2019 |
| JP | 2019-527418 | A | 9/2019 |
| JP | 2020-163986 | A | 10/2020 |
| JP | 2020-166659 | A | 10/2020 |
| KR | 10-1470190 | B1 | 12/2014 |
| KR | 10-2017-0060931 | A | 6/2017 |
| KR | 10-2019-0014429 | A | 2/2019 |

\* cited by examiner

FIG. 4

| TYPE | FUNCTION | CONTROL | OPERATION | CONDITION | Sensor Availability | CASE |
|---|---|---|---|---|---|---|
| MINIMAL RISK MANEUVER WITHOUT LANE CHANGE | STRAIGHT STOP | LONGITUDINAL DIRECTION | REMOVE BRAKE OR DRIVING FORCE | ONLY BRAKE CONTROL IS POSSIBLE AND OTHER FUNCTIONS FAIL | | |
| | CURRENT LANE STOP | LATERAL DIRECTION AND LONGITUDINAL DIRECTION | LANE MAINTENANCE & SMOOTH STOP | STEERING AND BRAKE CONTROL ARE POSSIBLE | FRONT OF CURRENT LANE REAR OF CURRENT LANE | |
| | | LATERAL DIRECTION | LANE MAINTENANCE & SUDDEN STOP | STEERING CONTROL IS POSSIBLE | FRONT OF CURRENT LANE REAR OF CURRENT LANE | |
| MINIMAL RISK MANEUVER WITH LANE CHANGE | OUT-OF-LANE STOP | LATERAL DIRECTION AND LONGITUDINAL DIRECTION | LANE MAINTENANCE & SMOOTH STOP | STEERING AND BRAKE CONTROL ARE POSSIBLE | FRONT OF CURRENT AND NEXT LANES REAR OF CURRENT AND NEXT LANES | |
| | | LATERAL DIRECTION AND LONGITUDINAL DIRECTION | LANE MAINTENANCE & SUDDEN STOP | STEERING AND BRAKE CONTROL ARE POSSIBLE | FRONT OF CURRENT AND NEXT LANES REAR OF CURRENT AND NEXT LANES | |

FIG. 5

| FAILURE | CIRCUMSTANCE | TYPE | OPERATION | REQUIRED FUNCTIONS |
|---|---|---|---|---|
| Human | Driver failure to perform | Driver not ready to take over | Visual Prompt | Active Driver Monitoring & Prompt System Available |
| | | | Audible Prompt | Active Driver Monitoring & Prompt System Available |
| | | | Haptic Prompt | Active Driver Monitoring & Prompt System Available |
| | | | Speed reduction Prompt | Active Driver Monitoring & Prompt System Available |
| | Driver failure to respond | Driver unable to take over | Takeover controlled by ADS | Active Driver Monitoring & Takeover System Available |
| Out of ODD | Road Shape | Out of Curve, Intersection, and Roundabout | Stop or Lower Speed | Steering & Acc. & Brake System Control Available |
| | Road Surface Condition | Pot hole, bump, Icy, Water | Stop or Lower Speed | Steering & Acc. & Brake System Control Available |
| | Weather | Rain, Fog, Snow. | Stop or Lower Speed | Steering & Acc. & Brake System Control Available |
| | Others | Speed Limits, Traffic Congestion, Etc. | Stop or Lower Speed | Steering & Acc. & Brake System Control Available |
| Inevitable Extrinsic Circumstances | Collision | By other vehicles | In-lane Stop or Lower Speed, ESS | Steering & Acc. & Brake System Control Available |
| | Physical failure | Flat tire, Etc. | In-lane Stop or Lower Speed, ESS | Steering & Acc. & Brake System Control Available |

FIG. 6

| FAILURE | CIRCUMSTANCE | TYPE | OPERATION | REQUIRED FUNCTIONS |
|---|---|---|---|---|
| Control System | Actuation Failure | Steering Failure | In-lane Stop or Lower Speed | Acc. & Brake Control System Available |
| | | Acceleration Means Failure | In-lane Stop or Lower Speed, ESS | Steering & Brake Control System Available |
| | | Deceleration Means Failure | ESS | Steering & Acc. Control System Available |
| | | Other Actuation Failure | In-lane Stop or Lower Speed, ESS | Steering& Acc. & Brake Control System Available |
| | ADS Failure | Lane Detection Failure | In-lane Stop or Lower Speed | Front Vehicle Following System Available |
| | | Front Object Detection Failure | In-lane Stop | Steering & Brake Control System Available |
| | | Rear Object Detection Failure | In-lane Stop or Lower Speed | Steering & Brake Control System Available |
| | | Side Object Detection Failure | In-lane Stop or Lower Speed | Steering & Brake Control System Available |
| | | ADS ECU Failure | In-lane Stop or Lower Speed | Alternative ADS ECU Available |
| | | In-Vehicle Network Failure | In-lane Stop or Lower Speed | Network Redundancy |
| | | Connection Failure for Connected ADS | In-lane Stop or Lower Speed, ESS | Steering & Brake Control System Available |

FIG. 7

| FAILURE | CIRCUMSTANCE | OPERATION | REQUIRED FUNCTIONS |
|---------|--------------|-----------|--------------------|
| Human | Prompt Driver | Visual prompt | Active Driver Monitoring & Prompt System Available |
| | | Audible prompt | Active Driver Monitoring & Prompt System Available |
| | | Haptic prompt | Active Driver Monitoring & Prompt System Available |
| | | Speed reduction warning | Active Driver Monitoring & Prompt System Available |
| | Informing to others | Switching hazard lights on | Lighting Control System Available |
| | | Transmitting emergency message to traffic control center | Communication Control System Available or Network Redundancy |
| Control System | Longitudinal | Lower Speed | Brake Control System Available |
| | | Driving Power Cutoff | Power Control System Available |
| | | In-lane Stop | Steering & Brake Control System Available |

FIG. 8

| FAILURE | CIRCUMSTANCE | OPERATION | REQUIRED FUNCTIONS |
|---|---|---|---|
| Control System | Longitudinal_Lateral | Keeping Lane | Steering & Acc. & Brake System Control Available |
| | | Emergency Shoulder Stop | Steering & Acc. & Brake System Control Available |
| | | Keeping Latest Steering Angle | Steering & Acc. & Brake System Control Available |
| | Control Authority Transition | Turn On/Off ADS | Power Control System & Authority Redundancy Available |
| | | Control Transition to Other Passenger | Authority Redundancy Available |
| | | Remote Control | Communication Control System & Authority Redundancy Available |

FIG. 11

| Category | Traffic Lane Stop | | Lane Change Plus Stop | | |
|---|---|---|---|---|---|
| Classification | Type 1 | Type 2 | Type 3 | Type 4 | Type 5 |
| | Straight Stop | In-lane Stop | Lane Change Plus Stop in Traffic Lane | Shoulder Stop | Parking Lane Stop |
| Description | | | | | |
| Lateral Control | NOT Required | Required | Required | Required | Required |
| Powertrain Control | NOT Required | NOT Required | Optional | Optional | Optional |
| Brake control | Required | Required | Required | Required | Required |
| Lane Change | NOT Required | NOT Required | Required | Required | Required |
| Potential Stopping Area Detection | NOT Required | NOT Required | NOT Required | Required | Required |

FIG. 14

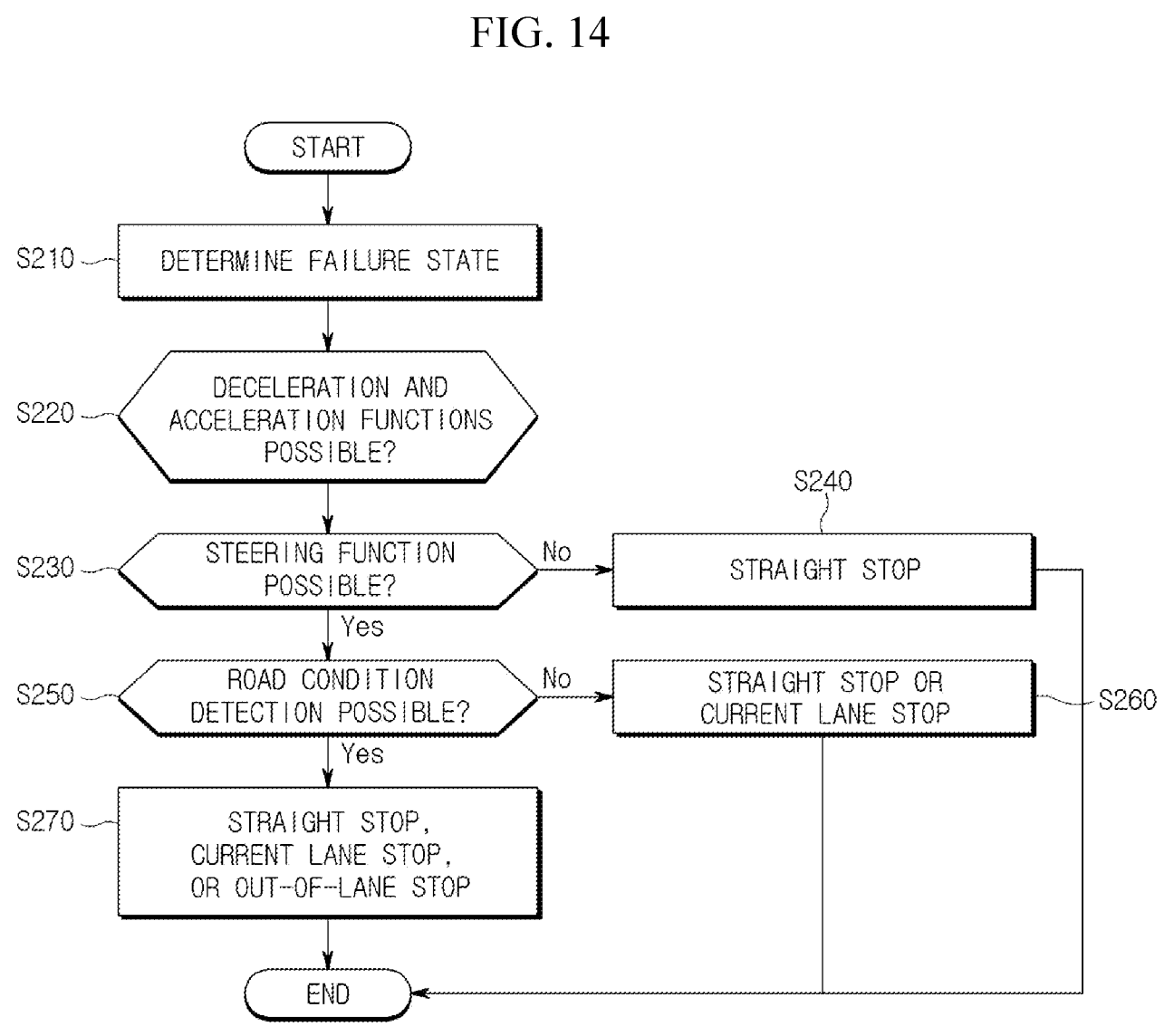

S210 — DETERMINE FAILURE STATE

S220 — DECELERATION AND ACCELERATION FUNCTIONS POSSIBLE?

S230 — STEERING FUNCTION POSSIBLE?

No → S240 — STRAIGHT STOP

Yes

S250 — ROAD CONDITION DETECTION POSSIBLE?

No → S260 — STRAIGHT STOP OR CURRENT LANE STOP

Yes

S270 — STRAIGHT STOP, CURRENT LANE STOP, OR OUT-OF-LANE STOP

END

VEHICLE FOR PERFORMING MINIMAL RISK MANEUVER AND METHOD FOR OPERATING THE SAME

CROSS-REFERENCE OF RELATED APPLICATIONS

The present application is a U.S. National Phase entry of International Patent Application No. PCT/KR2021/014659, filed Oct. 20, 2021, which claims priority to Korean Patent Application Number 10-2020-0140550, filed Oct. 27, 2020, the disclosures of which are incorporated by reference herein in their entireties.

TECHNICAL FIELD

The present disclosure relates to a vehicle for performing a minimal risk maneuver and a method for operating the same.

BACKGROUND

Recently, an advanced driver assistance system (ADAS) has been developed to assist drivers in driving. The ADAS has multiple sub-technology classifications and provides convenience to the driver. Such an ADAS is also called autonomous driving or an automated driving system (ADS).

Meanwhile, when a vehicle performs autonomous driving, an unexpected accident or event may occur. If an appropriate response to the event is not performed, the vehicle may be in risk.

DISCLOSURE

Technical Problem

According to the present disclosure, when the vehicle is in risk due to an event occurring while the vehicle is being driven, a minimal risk maneuver for eliminating (or reducing) the risk can be performed.

Technical Solution

One embodiment is a vehicle which is able to perform autonomous driving without intervention of a driver, to perform a minimal risk maneuver (MRM) when a specific event occurs during the autonomous driving, to eliminate the risk of the vehicle in accordance with the initiation of the minimal risk maneuver, and to convert the condition of the vehicle into a minimal risk condition by ending the minimal risk maneuver when the risk of the vehicle is eliminated.

Advantageous Effect

According to the present disclosure, even if a vehicle is in risk due to an event occurring during autonomous driving, the minimal risk maneuver capable of eliminating the risk can be performed. Accordingly, the vehicle can escape from the risk and the condition of the vehicle can be converted into a minimal risk condition, so that the driving stability of the vehicle can be further increased.

BRIEF DESCRIPTION OF THE DRAWINGS

FIG. 4 shows an example of a minimal risk maneuver (MRM) according to the first embodiment of the present disclosure.

FIG. 5 shows examples of the minimal risk maneuver according to the first embodiment of the present disclosure.

FIG. 6 shows examples of the minimal risk maneuver according to the first embodiment of the present disclosure.

FIG. 7 shows examples of the minimal risk maneuver according to the first embodiment of the present disclosure.

FIG. 8 shows examples of the minimal risk maneuver according to the first embodiment of the present disclosure.

FIG. 11 is a view for describing an MRM type according to the second embodiment of the present disclosure.

FIG. 14 is a flowchart showing a method for selecting a type of a minimal risk maneuver according to a third embodiment of the present disclosure.

MODE FOR INVENTION

Hereinafter, the present disclosure will be described with reference to the accompanying drawings.

In the description of a plurality of embodiments in the present disclosure, each of the embodiments may be independent or two or more embodiments may be mixed.

Figure 1:
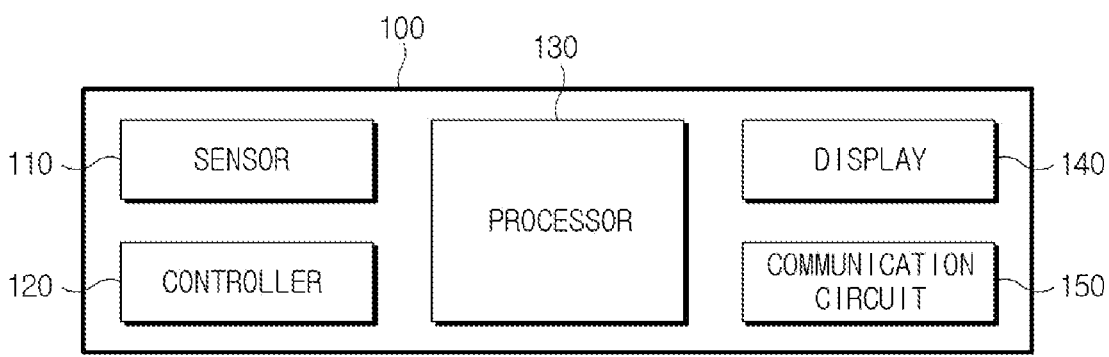
FIG. 1 shows a vehicle according to an embodiment of the present disclosure.

FIG. 1 shows a vehicle according to a first embodiment of the present disclosure. Referring to FIG. 1, a vehicle 100 may support autonomous driving. According to embodiments, the vehicle 100 can perform steering, acceleration, braking, shifting, or parking without an operation of a driver, and can be driven under the control of the driver when the driver intervenes. For example, the vehicle 100 may mean a vehicle capable of performing autonomous driving according to a level 3 or higher according to society of automation engineers (SAE). However, the present disclosure is not limited thereto.

For example, the autonomous driving described herein may include at least one of functions of an automated driving systems (ADS) such as a pedestrian detection and collision mitigation system (PDCMS), a lane change decision aid system (LCAS), a land departure warning system (LDWS), an adaptive cruise control (ACC), and a lane keeping assistance system (LKAS), a road boundary departure prevention system (RBDPS), a curve speed warning system (CSWS), a forward vehicle collision warning system (FVCWS), and low speed following (LSF).

The vehicle 100 may include a sensor 110, a controller 120, a processor 130, a display 140, and a communication circuit 150.

The sensor 110 may sense surroundings of the vehicle 100 and generate data related to the surroundings of the vehicle 100. According to the embodiments, the sensor 100 may include at least one of a camera, a light detection and ranging (LIDAR) sensor, a radio detection and ranging (RADAR) sensor, and a position sensor.

The camera may photograph the surroundings of the vehicle 100 and generate an image of the surroundings of the vehicle 100 in accordance with the photographing result. The camera may detect the front, rear, and/or side of the vehicle 100 and may generate image data according to the detection result. For example, the camera may generate image data for other objects (e.g., other vehicles, people, objects, lanes, obstacles) located at the front, rear and/or side of the vehicle 100.

According to the embodiments, the camera may include an image sensor, an image processor, and a camera MCU. For example, the image sensor may sense an image of a subject photographed through a lens, the image processor may receive and process the data from the image sensor, and the camera MCU may receive the data from the image processor.

The LIDAR sensor may detect the front, rear, and/or side of the vehicle 100 by using light (or laser) and may generate detection data according to the detection result. For example, the LIDAR sensor may sense or recognize other objects (e.g., other vehicles, people, objects, lanes, and obstacles) located at the front, rear and/or sides of the vehicle 100.

According to the embodiments, the LIDAR sensor may include a laser transmission module, a laser detection module, a signal collection and processing module, and a data transmission/reception module. A light source of the laser may have a wavelength in a wavelength range of 250 nm to 11 μm. Alternatively, wavelength tunable laser light sources can be used. Also, the LIDAR sensor may be divided into a time of flight (TOF) type and a phase shift type, depending on a signal modulation method.

The RADAR sensor may detect the front, rear, and/or side of the vehicle 100 by using electromagnetic waves (or radio waves), and may generate detection data according to the detection result. For example, the RADAR sensor may sense or recognize other objects (e.g., other vehicles, people, objects, lanes, and obstacles) located at the front, rear and/or sides of the vehicle 100.

The RADAR sensor can detect an object up to 150 m ahead within a range of a horizontal angle of 30 degrees by using a frequency modulation carrier wave (FMCW) method or a pulse carrier method. The RADAR sensor may process data generated according to the detection result, and such processing may include enlarging the sensed front object or focusing on the area of the object among the entire field of view.

The position sensor can measure a current position of the vehicle 100. According to the embodiments, the position sensor may include a GPS sensor, and the GPS sensor can measure the position, speed, and current time of the vehicle 100 through the communication with a satellite. According to the embodiments, the GPS sensor can measure a delay time of a radio wave emitted from a satellite and obtain a position of the vehicle 100 based on a distance from an orbit.

The controller 120 can control the operation of the vehicle 100 according to the control of the processor 130. According to the embodiments, the controller 120 can control steering, driving, braking, and shifting of the vehicle 100. For example, the controller 120 can control components for steering, driving, braking, and shifting of the vehicle 100, respectively.

The controller 120 can control the steering of the vehicle 100 according to the control of the processor 130. In the embodiments, the controller 120 can control a motor-driven power steering (MPDS) that drives a steering wheel. For example, when vehicle collision is expected, the controller 120 can control the steering of the vehicle in a direction which avoids the collision or minimizes damage.

The controller 120 can control the driving of the vehicle 100 according to the control of the processor 130. According to the embodiments, the controller 120 can decelerate or accelerate the vehicle 100 or turn on/off the engine. For example, the controller 120 can accelerate or decelerate according to the control of the processor 130, and can turn on/off the engine when the driving of the vehicle 100 is started or finished.

Also, the controller 120 can control the driving of the vehicle 100 without the control of the driver. For example, the controller 120 can perform autonomous driving of the vehicle 100 under the control of the processor 130.

The controller 120 can control the braking of the vehicle 100 according to the control of the processor 130. According to the embodiments, the controller 120 can control whether or not the brake of the vehicle 100 is operated and can control the pedal effort of the brake. For example, the controller 120 can control emergency braking to be operated automatically when collision is expected, etc.

The processor 130 may control the overall operation of the vehicle 100. According to the embodiments, the processor 130 may be an electrical control unit (ECU) capable of integrally controlling components within the vehicle 100. For example, the processor 130 may include a central processing unit (CPU) or a micro processing unit (MCU) capable of performing arithmetic processing.

The processor 130 can perform a determination related to the control of the vehicle 100, and can control the controller 120 in accordance with the determination result. According to the embodiments, the processor 130 can receive data from the sensor 100 and generate a control command for controlling the controller 120 based on the received data. The processor 130 may transmit the control command to the controller 120. Also, the processor 130 may receive the input or control from the driver and control the controller 120 according to the input from the driver.

Meanwhile, in the above description, it is assumed that the controller 120 and the processor 130 are separate components. However, according to the embodiments, the controller 120 and the processor 130 may be integrated as one component. For example, the controller 120 and the processor 130 may be integrated as one device and interwork with each other.

The display 140 can visually display information related to the vehicle 100. According to the embodiments, the display 140 can provide various information related to the vehicle 100 to the driver of the vehicle 100 under the control of the processor 130. For example, the display 140 may visually display a current state of the vehicle 100 under the control of the processor 130.

The communication circuit 150 can communicate with the outside of the vehicle 100. According to the embodiments, the communication circuit 150 can receive data from the outside of the vehicle 100 or transmit data to the outside of the vehicle 100 under the control of the processor 130. For example, the communication circuit 150 may perform communication by using a wireless communication protocol or a wired communication protocol.

For example, the vehicle 100 may communicate with another vehicle (vehicle to vehicle) or with an infrastructure (vehicle to infrastructure) by using the communication circuit 150.

Figure 2:
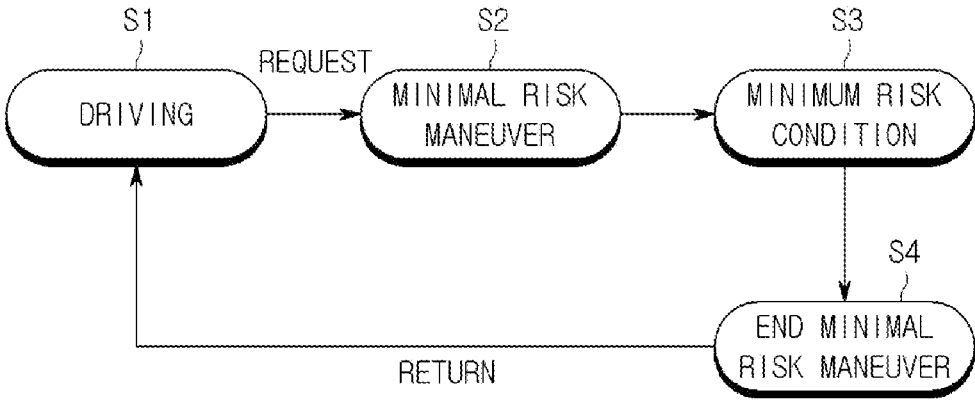
FIG. 2 is a diagram showing a state of a vehicle according to a first embodiment of the present disclosure.

FIG. 2 is a diagram showing a state of the vehicle according to the first embodiment of the present disclosure. Referring to FIGS. 1 and 2, the state of the vehicle 100 may be changed (or transitioned) according to the diagram shown in FIG. 2.

The state of the vehicle 100 may be any one of a driving state S1, a minimum risk maneuver (MRM) state S2, a minimum risk condition state S3, and a minimum risk maneuver end state S4. According to the embodiments, the states S1 to S4 may be transitioned to other states when a specific condition is met.

The driving state S1 may mean a state in which the vehicle 100 is being driven. According to the embodiments, in the driving state S1, the vehicle 100 may drive under the control of the processor 130. For example, the driving state S1 may mean a state in which the vehicle 100 is being autonomously driven.

The minimum risk maneuver state S2 may mean a state in which the vehicle 100 performs a minimal risk maneuver according to a request for the minimal risk maneuver. According to the embodiments, the vehicle 100 being driven may initiate the minimal risk maneuver when the minimal risk maneuver is required. That is, the driving state S1 may be transitioned to the minimum risk maneuver state S2.

In the minimum risk maneuver state S2, the vehicle 100 may perform an operation for reducing the risk of the vehicle 100. According to the embodiments, the vehicle 100 may determine whether or not the minimal risk maneuver is required according to various methods, and generate a request for the minimal risk maneuver when the minimal risk maneuver is required. For example, the vehicle 100 may perform the minimal risk maneuver by performing at least one of steering, deceleration, acceleration, lane change, and emergency braking. The minimal risk maneuver does not inhibit other safety functions of the vehicle 100 (e.g., automatic emergency braking, pedestrian collision detection braking, bicycle collision detection braking, etc.). That is, the minimal risk maneuver and other safety functions of the vehicle 100 may be performed in parallel or sequentially.

When the minimal risk maneuver is initiated, the vehicle 100 may perform the minimal risk maneuver prior to the existing driving and obtain a driver's control authority. That is, the vehicle 100 may cancel or stop the previously set driving and perform the minimal risk maneuver.

When the vehicle 100 performs autonomous driving, a specific event that prevents the autonomous driving from continuing may occur. When the specific event occurs, the vehicle 100 may be in a (unexpected) risk state. The minimal risk maneuver may be performed on the vehicle 100 in order to release (or relieve) such a risk state. For example, the vehicle 100 may automatically detect a specific event and automatically perform the minimal risk maneuver according to the occurrence of the specific event.

The specific event may include failure of components of the vehicle 100, deviation of the vehicle 100 path, control failure of the vehicle 100.

According to the embodiments, when the autonomous driving, the components for performing the autonomous driving, or components of another vehicle 100 fails, the vehicle 100 can perform the minimal risk maneuver.

Also, according to the embodiments, when the vehicle 100 approaches a boundary of an operational design domain (ODD), the minimal risk maneuver can be performed. The operational design may be a drivable domain designed to allow the vehicle 100 to perform the autonomous driving. For example, when the vehicle 100 approaches from the inside of the operational design domain to the outer boundary of the operational design domain, the vehicle 100 can perform the minimal risk maneuver.

Also, according to the embodiments, the vehicle 100 may perform the minimal risk maneuver when the transfer (taking over) of the control authority of the vehicle 100 to the driver fails. In a case where the vehicle 100 is changed from an autonomous driving mode to a manual driving mode (e.g., in the case of level 3 autonomous driving), when the driver fails to control the vehicle 100 (e.g., a dynamic driving task (DDT) of SAE), the minimal risk maneuver can be initiated. For example, in a case where the transfer of the control authority to the driver of the vehicle 100 fails when the vehicle 100 is changed from the autonomous driving mode to the manual driving mode, the minimal risk maneuver can be initiated. That is, even though a specific control operation (e.g., brake operation or steering, etc.) by the driver is required, when the driver does not perform the specific control operation, the minimal risk maneuver can be initiated.

If the minimal risk maneuver is not performed, the vehicle 100 may collide with another vehicle, pedestrians, or other structures due to a malfunction of (autonomous) driving, and thus the driver, occupant or pedestrian may be injured. Further, due to the malfunction, the vehicle 100 may deviate from the road. In other words, in the absence of the minimal risk maneuver, the autonomous driving of the vehicle 100 may not perform well as expected. In order to avoid the occurrence of such undesired specific events, the minimal risk maneuver is necessary.

In the minimum risk maneuver state S2, that is to say, when the minimal risk maneuver is initiated, the vehicle 100 can perform operations that minimize the risk of the vehicle 100 and the driver or occupant of the vehicle 100 until the risk around the vehicle 100 is eliminated and a risk-free state is guaranteed.

According to the embodiments, depending on the initiation of the minimal risk maneuver, the vehicle 100 can perform at least one of stopping the vehicle, controlling the steering of the vehicle, maintaining a lane, providing visual, audible and tactile notifications, decelerating the vehicle, accelerating the vehicle, and initiating/ending the autonomous driving, turning off the vehicle, transmitting an emergency signal, controlling a hazard warning light, speed reduction warning, controlling a brake light, transferring control authority to another passenger, and remote control.

The minimum risk condition state S3 may mean a state in which the risk of the vehicle 100 is eliminated or reduced. According to the embodiments, as the minimal risk maneuver is performed by the vehicle 100, the risk of the vehicle 100 can be removed. That is, the minimum risk maneuver state S2 may be transitioned to the minimum risk condition state S3. For example, the minimum risk condition may mean a case in which the vehicle 100 is in a stable state or the vehicle 100 has stopped. This minimum risk condition can be met by the operation of the driver or by the vehicle 100 itself.

The minimum risk condition can be met when the risk of the vehicle 100 is eliminated. In other words, in order to meet the minimum risk condition, the minimal risk maneuver can be performed.

On the other hand, if the minimum risk condition is not met, the vehicle 100 may continue to perform the minimal risk maneuver. In this case, the transition from the minimum risk maneuver state S2 to the minimum risk condition state S3 may not occur. For example, when the minimum risk condition is not met, the vehicle 100 can ignore controls other than the control of the vehicle 100 for the minimal risk maneuver. That is, when the minimal risk maneuver is initiated, the vehicle 100 continues to perform the minimal risk maneuver regardless of the control of the driver.

The minimal risk maneuver end state S4 may mean a state in which the risk of the vehicle 100 is eliminated (i.e., the minimum risk condition is met) and the minimal risk maneuver is ended. That is, the minimum risk condition state S3 may be transitioned to the minimal risk maneuver end state S4.

According to the embodiments, when the minimum risk condition of the vehicle 100 is met after the minimal risk maneuver is performed, the vehicle 100 may end the minimal risk maneuver. For example, when the vehicle 100 is stopped, the minimal risk maneuver may be stopped or ended.

According to the embodiments, the vehicle 100 may end the minimal risk maneuver when the minimal risk condition is met and a reference time elapses. For example, when the minimal risk maneuver is performed and the vehicle 100 is stopped, the vehicle 100 may end the minimal risk maneuver if the stop state is maintained for a reference time.

After the minimal risk maneuver is ended, the vehicle 100 can start driving again. According to the embodiments, when the minimal risk maneuver is ended, the vehicle 100 may start new driving or continue the existing driving according to the operation of the driver or the control of the processor 130.

In summary, referring to the diagram of FIG. 2, the vehicle 100 according to the present disclosure can perform (autonomous) driving (i.e., the driving state S1). When a specific event occurs during the driving of the vehicle 100, the vehicle 100 may perform the minimal risk maneuver (i.e., the minimum risk maneuver state S2). When the minimal risk maneuver is initiated, the risk of the vehicle 100 is eliminated (i.e., the minimum risk condition state S3). When the risk of the vehicle 100 is eliminated, the minimal risk maneuver is ended (i.e., the minimum risk maneuver end state S4). After the minimal risk maneuver is ended, the vehicle 100 can perform driving again.

Figure 3:
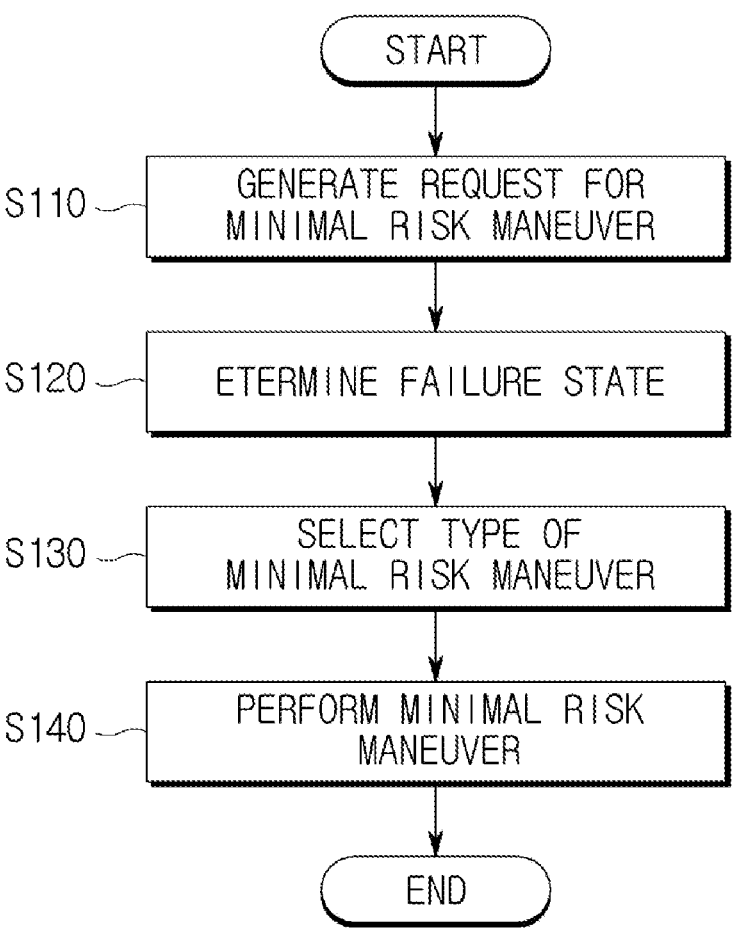
FIG. 3 is a flowchart showing an operation of the vehicle according to the first embodiment of the present disclosure.

FIG. 3 is a flowchart showing the operation of the vehicle according to the first embodiment of the present disclosure. Referring to FIGS. 1 to 3, a request for the minimal risk maneuver is generated (S110). According to the embodiments, the processor 130 may detect the vehicle 100 and a state around the vehicle 100, and may generate the request for the minimal risk maneuver in accordance with the detection result. Alternatively, the vehicle 100 may recognize the request for the minimum risk maneuver transmitted from the outside. The request for the minimal risk maneuver may mean an arbitrary command which causes the vehicle 100 to perform the minimal risk maneuver.

When there is a request for the minimal risk maneuver, the vehicle 100 can determine a failure state (S120). According to the embodiments, the vehicle 100 may monitor the state of each of the components of the vehicle 100 and identify the failed components. The vehicle 100 may monitor the state of each of the components of the vehicle 100 in real time. The vehicle 100 may determine which sensor is currently available (or operable) among the sensors 110.

Also, the vehicle 100 can determine a failure state and a cause (or situation) of the failure state. For example, the vehicle 100 can additionally determine what causes the determined failure state.

The vehicle 100 may select a type of the minimal risk maneuver (S130). According to the embodiments, the vehicle 100 may select the type of the minimal risk maneuver suitable for a current failure state based on the determination result of the failure state.

The type of the minimal risk maneuver may include stopping the vehicle, controlling the steering of the vehicle, maintaining a lane, providing visual, audible and tactile notifications, decelerating the vehicle, accelerating the vehicle, and initiating/ending the autonomous driving, turning off the vehicle, transmitting an emergency signal, controlling a hazard warning light, speed reduction warning, controlling a brake light, transferring control authority to another passenger, and remote control.

The vehicle 100 can initiate the minimal risk maneuver by using the selected type of the minimal risk maneuver (S140). According to the embodiments, the vehicle 100 can control the vehicle 100 according to the selected type of the minimum risk maneuver. For example, the processor 130 of the vehicle 100 may transmit a control command corresponding to the selected type of the minimum risk maneuver to the controller 120, and the controller 120 may control the vehicle 100 in accordance with the control command.

FIG. 4 shows an example of the minimal risk maneuver according to the first embodiment of the present disclosure. Referring to FIGS. 1 to 4, a minimal risk maneuver without lane change and a minimal risk maneuver with the lane change are shown. That is, the vehicle 100 may perform the minimal risk maneuver on the vehicle 100 without the lane change according to the initiation of the minimal risk maneuver, or may perform the minimal risk maneuver on the vehicle 100 together with the lane change. The minimal risk maneuver without the lane change may include straight stop and current lane stop, and out-of-lane stop may include adjacent lane stop and shoulder stop. Lane change plus stop may mean the out-of-lane stop.

The vehicle 100 may perform at least one of the straight line stop, current lane stop, and out-of-lane stop based on the current failure state and the type of an available sensor (sensor effectiveness).

The straight stop means stop made by controlling longitudinally (i.e., in the traveling direction) without lateral control of the vehicle 100. According to the embodiments, the vehicle 100 may perform the straight stop through deceleration without steering control of the vehicle 100. For example, the vehicle 100 may perform the straight stop by decelerating (e.g., activating a brake) without controlling the steering of the vehicle 100.

When only the brake control of the vehicle 100 is possible and other control functions fail, the straight stop can be performed by controlling the brake of the vehicle 100 or by removing the driving force of the vehicle 100.

The current lane stop means stop made in the lane (i.e., the current lane) in which the vehicle 100 is traveling before initiating the minimal risk maneuver. According to the embodiments, according to the current lane stop, the vehicle 100 can stop within a boundary of the current lane in which the vehicle 100 is traveling. For example, the vehicle 100 can stop within the boundary of the current lane by recognizing the current lane by using the sensor 110 and by controlling the steering of the vehicle 100 along the current lane by using a steering function.

According to the embodiments, the vehicle 100 may perform the current lane stop through lateral and longitudinal control or lateral control.

For example, when steering and brake control of the vehicle 100 is possible and the front and rear detection of the current lane is possible, the vehicle 100 performs a smooth stop while maintaining the current lane through lateral and longitudinal control, thereby performing the current lane stop.

For example, when steering control of the vehicle 100 is possible and the front and rear detection of the current lane is possible, the vehicle 100 performs a sudden stop while maintaining the current lane through lateral control, thereby performing the current lane stop. In this case, the brake control may not operate normally.

The out-of-lane stop means stop made outside the lane in which the vehicle 100 is traveling before initiating the minimal risk maneuver of the vehicle 100. According to the embodiments, the vehicle 100 can stop by using a steering control function out of the current lane in which the vehicle 100 is traveling. For example, the vehicle 100 can stop within a boundary of another lane adjacent to the current lane or may stop within a range of a shoulder.

The vehicle 100 can recognize another lane adjacent to the current lane by using the sensor 110 and can stop within a boundary of the above-described another lane. In this case, the vehicle 100 can perform a lane change from the current driving lane to another lane by using the sensor 110.

The vehicle 100 can recognize the shoulder by using sensor 110 and stop within a boundary of the current shoulder. Here, the vehicle 100 can determine whether the adjacent lane is a shoulder or not by applying a condition for identifying a shoulder (e.g., a solid lane).

According to the embodiments, the vehicle 100 can perform the out-of-lane stop through lateral and longitudinal control.

For example, when steering and brake control of the vehicle 100 is possible and the front and rear detection of the current and next lanes is possible, the vehicle 100 performs a smooth stop or a sudden stop while changing the current lane through lateral and longitudinal control, thereby performing the out-of-lane stop. Also, when steering and brake control of the vehicle 100 is possible and the front and rear detection of the current and next lanes is possible, the vehicle 100 performs a smooth stop or a sudden stop while changing the current lane through lateral and longitudinal control, thereby performing the shoulder stop.

FIG. 5 shows examples of the minimal risk maneuver according to the first embodiment of the present disclosure. The vehicle 100 may perform the minimal risk maneuver according to the examples shown in FIG. 5. Referring to FIG. 5, the vehicle 100 may perform the minimal risk maneuver when a failure related to a driver (or a person) occurs, when the vehicle 100 is out of the operational design section (ODD), or when a failure occurs due to inevitable extrinsic circumstances.

The vehicle 100 may generate (or provide) a notification when the driver does not control the vehicle 100. According to the embodiments, the vehicle 100 may detect the state of the driver by performing active driver monitoring. When the transfer of the control authority to the driver is not prepared according to the detection result, the vehicle 100 may provide a notification of the preparation for the transfer of the control authority to the driver by using the notification function. For example, the vehicle 100 may provide a notification of the preparation for the transfer of the control authority to the driver through a visual, auditory, or tactile notification.

The vehicle 100 may perform the autonomous driving when the driver does not respond. According to the embodiments, the vehicle 100 may detect the state of the driver by performing dynamic driver monitoring. When the driver does not respond to the preparation for the transfer of the control authority (i.e., when the transfer of the control authority is impossible) according to the detection result, the vehicle 100 may perform the autonomous driving without transferring the control authority to the driver.

When the vehicle 100 is out of the operational design domain ODD, the vehicle 100 can reduce its speed or stop. According to the embodiments, when the vehicle is out of the operational design domain ODD, the vehicle 100 can reduce its speed or stop by using at least one of steering control, acceleration control, and brake control.

The vehicle 100 may determine whether the vehicle 100 is out of the operational design domain ODD or not by detecting the shape of the road (curved road, intersection or roundabout), road surface conditions (pot hole, bump, icy road, water), weather (rain, fog, snow), and others (speed limit, traffic jam, etc.), and may reduce its speed or stop according to the determination result.

When a failure occurs due to inevitable extrinsic circumstances, the vehicle 100 may reduce its speed or may perform in-lane stop or (emergency) shoulder stop. According to the embodiments, when a failure occurs due to inevitable extrinsic circumstances, the vehicle 100 can reduce its speed or perform the in-lane stop or (emergency) shoulder stop by using at least one of steering control, acceleration control, and brake control.

The vehicle 100 determines whether or not collision occurs by another vehicle or determines whether or not a failure occurs in the components of the vehicle (such as tire puncture). According to the determination result, the vehicle 100 can reduce its speed or perform the in-lane stop or (emergency) shoulder stop.

FIG. 6 shows examples of the minimal risk maneuver according to the first embodiment of the present disclosure. The vehicle 100 may perform the minimal risk maneuver according to the examples shown in FIG. 6. Referring to FIG. 6, the vehicle 100 may perform the minimal risk maneuver when a failure occurs in a control system.

When a failure occurs in an actuation (driving) function, the vehicle 100 may perform the minimal risk maneuver.

For example, when a failure occurs in the steering function, the vehicle 100 may perform the in-lane stop or reduce its speed by using at least one of the acceleration control and the brake control.

For example, when a failure occurs in an acceleration means, the vehicle 100 may perform the in-lane stop, deceleration, or shoulder stop by using at least one of the steering control and the brake control.

For example, when a failure occurs in a deceleration means, the vehicle 100 may perform the shoulder stop by using at least one of the steering control and the acceleration control.

For example, when a failure occurs in other driving means, the vehicle 100 may perform the in-lane stop, deceleration, or shoulder stop by using at least one of the steering control, the acceleration control, and the brake control.

When a failure occurs in an autonomous driving function, the vehicle 100 may perform the minimal risk maneuver.

For example, when a failure occurs in a lane detection function, the vehicle 100 may perform the in-lane stop or deceleration by using a front vehicle following function.

For example, when a failure occurs in a front object detection function, the vehicle 100 may perform the in-lane stop by using at least one of the steering control and the brake control.

For example, when a failure occurs in a rear and side object detection function, the vehicle 100 may perform the in-lane stop or deceleration by using at least one of the steering control and the brake control.

For example, when a failure occurs in an autonomous driving ECU, the vehicle 100 may perform the in-lane stop or deceleration by using an alternative autonomous driving ECU.

For example, when a failure occurs in an in-vehicle network, the vehicle 100 may perform the in-lane stop or deceleration by using network redundancy. That is, even if a failure occurs in the in-vehicle network, the vehicle 100 transmits commands on the network by using previously obtained redundancy, thereby performing the in-lane stop or deceleration.

For example, when a failure occurs in the connection for the connected ADS, the vehicle 100 may perform the in-lane stop, deceleration, or shoulder stop by using at least one of the steering control and the brake control.

FIG. 7 shows examples of the minimal risk maneuver according to the first embodiment of the present disclosure. The vehicle 100 may perform the minimal risk maneuver according to the examples shown in FIG. 7. Referring to FIG. 7, the vehicle 100 may perform the minimal risk maneuver when a driver (or a person) makes a wrong action or a failure occurs in the control system.

When a failure related to a driver (or a person) occurs, the vehicle 100 may provide a notification to the driver. According to the embodiments, the vehicle 100 may detect the state of the driver by performing the active driver monitoring. When a failure related to a driver (or a person) occurs, the vehicle 100 may provide a visual, auditory, or tactile notification to the driver. For example, the vehicle 100 may provide a speed reduction warning to the driver.

When a failure occurs in the control system, the vehicle 100 may provide a notification to the outside or perform the longitudinal control thereof.

For example, when a failure occurs in the control system, the vehicle 100 may turn on or off the hazard warning light by using lighting control or transmit an emergency message to a control center by using a communication control function (or network redundancy).

For example, when a failure occurs in the control system, the vehicle 100 may reduce the speed of the vehicle 100 by using a brake control function, may turn off the power of the engine (or driving means) by using a power control function, or may perform the in-lane stop by using the steering control and the brake control.

FIG. 8 shows examples of the minimal risk maneuver according to the first embodiment of the present disclosure. The vehicle 100 may perform the minimal risk maneuver according to the examples shown in FIG. 8. Referring to FIG. 8, the vehicle 100 may perform the minimal risk maneuver when a failure occurs in the control system.

When a failure occurs in the control system, the vehicle 100 may perform the longitudinal control thereof or transfer (or take over) the control authority.

For example, when a failure occurs in the control system, the vehicle 100 can maintain the driving lane thereof, perform the shoulder stop, or maintain a directly preceding steering angle by using at least one of the steering function, an acceleration function, and a brake function.

For example, when a failure occurs in the control system, the vehicle 100 may control the turn-on/turn-off of the autonomous driving function by using the power control function and an authority redundancy function. The vehicle 100 may turn off the autonomous driving function by turning off the ignition of the vehicle 100 or by transferring the authority for the autonomous driving of the vehicle 100 to another entity (e.g., a driver). The vehicle 100 may turn on the autonomous driving function in the opposite manner to the above.

For example, when a failure occurs in the control system, the vehicle 100 may transfer the authority to another passenger by using the authority redundancy function. The vehicle 100 may be changed into the manual driving mode by transferring the control authority to another passenger.

For example, when a failure occurs in the control system, the vehicle 100 may perform remote control by using at least one of the communication control function and the authority redundancy function. The vehicle 100 may be remotely controlled by transferring the control authority of the vehicle 100 to the outside.

Figure 9:
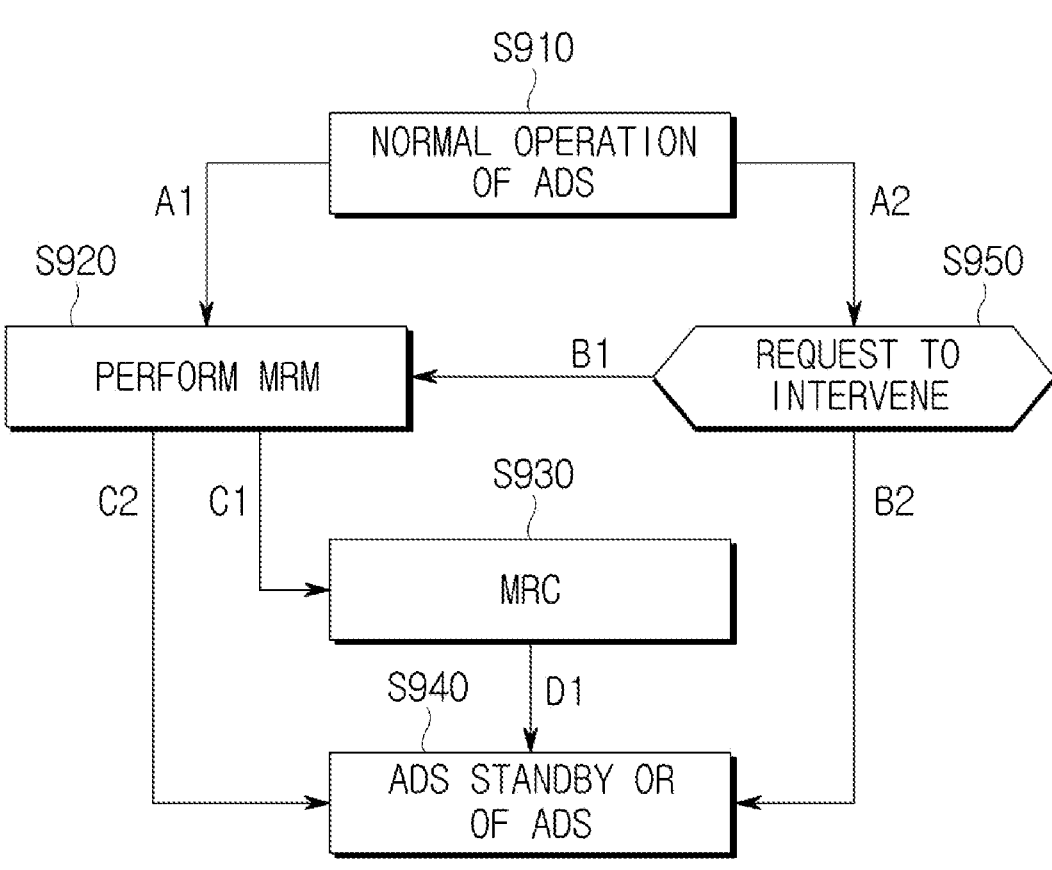
FIG. 9 is a block diagram for describing steps of performing a minimal risk maneuver (MRM) according to a second embodiment of the present disclosure.

FIG. 9 is a block diagram for describing steps of performing the minimal risk maneuver (MRM) according to a second embodiment of the present disclosure.

While the autonomous driving is being performed according to the ADS, an event in which the autonomous driving cannot be continued may occur. For example, an event corresponding to a failure of an autonomous driving system of level 3 to 5 autonomous driving may occur. Alternatively, there may occur an event in which an autonomous vehicle of level 3 or 4 autonomous driving is at risk of violating the operational design domain (ODD) limit. The ODD may refer to a boundary of a road as an operational design domain. Alternatively, there may occur an event in which the driver cannot obtain a driving authority although the ADS requests the intervention of the driver in the system of level 3 to 5 autonomous driving.

In such a situation, the ADS can ensure the safety of vehicle occupants by performing the minimal risk maneuver. For this, the system must select the most appropriate MRM type. In the selection, the state of the corresponding vehicle, surrounding traffic conditions, etc., may be considered. When the minimal risk maneuver is performed, the vehicle performs a stop in the longitudinal direction. When the lateral control is possible, the lateral control may also be performed.

The present disclosure presents the following five MRM types. However, the scope of the present disclosure is not limited thereto and the present disclosure can include other MRM types which are the same as or similar to the five MRM types.

As a level 1 MRM type, the straight stop is performed only in the longitudinal direction, and no longitudinal control is involved.

As a level 2 MRM type, the in-lane stop means that the vehicle stops within the boundary of a lane in which the vehicle is traveling.

As a level 3 MRM type, a lane change plus stop in traffic lane means that the vehicle stops with lane change within the boundary of a road in which a plurality of lanes are present.

As a level 4 MRM type, the shoulder stop means that the vehicle changes the lane and stops on the shoulder out of the boundary of the road.

As a level 5 MRM type, a parking lane stop means that the vehicle changes the lane and stops within a parking line out of the boundary of the road.

The vehicle mentioned in this disclosure may include a subject vehicle and a target vehicle. The subject vehicle refers to a vehicle to which the minimal risk maneuver is applied, and the target vehicle refers to a vehicle which is in the vicinity of the subject vehicle and has a possibility of collision with the subject vehicle.

Also, a potential stopping area mentioned in the present disclosure refers to an area adjacent to the current position of the subject vehicle, and the subject vehicle can stop in the potential stopping area. For example, the potential stopping area can be determined by using position information such as an HD map, sensing information input through the sensor, information input through a communication device, etc.

Also, the lane boundary mentioned in the present disclosure may be determined by a visually recognizable marking, and if there is no visually recognizable marking, temporarily recognizable road characteristics may be determined as the lane boundary. Alternatively, the lane boundary can be determined by using information received from a GPS or V2V and V2I information received from a communication device.

Referring to FIG. 9, a step S910 in which the ADS normally operates is shown. In step S910, the autonomous driving system (ADS) normally performs a function as intended. The ADS can determine whether the minimal risk maneuver is required or not.

When an event A1 occurs in the ADS normal operation step S910, a transition to an MRM performing step S920 may occur. The event A1 may be a request for the minimal risk maneuver by the ADS.

When an event A2 occurs in the ADS normal operation step S910, a transition to a driver intervention request (i.e., request to intervene, RTI) step S950 may occur. The event A2 may mean that the RTI is performed by the ADS or may mean a level 3 autonomous driving. Alternatively, the event A2 may mean that a warning is issued to the driver by the ADS or may mean level 4 or 5 autonomous driving. Such an event A2 may be optional.

In the driver intervention request (RTI) step S950, the ADS may request the driver to receive the driving authority. Since there may be cases where a person is not able to drive, this step can be performed only by a specified ADS (e.g., an ADS of level 3 autonomous driving). Specifically, when an event B1 occurs in the RTI step S950, a transition to the MRM performing step S920 may occur. The event B1 may exceed a predetermined period of time after the driver intervention request (RTI) is made. Alternatively, when an event B2 occurs, a transition to an ADS standby or ADS off step S940 may occur. The event B2 may mean a case where the driver begins to intervene (e.g., level 3 autonomous driving) or a case where a warning is issued (e.g., level 4 or 5 autonomous driving).

In the MRM performing step S920, the ADS can control the subject vehicle. Specifically, in the MRM performing step S920, the ADS can monitor the state of the ADS, determine the MRM type, control the subject vehicle, and warn factors (e.g., surrounding vehicles) around the subject vehicle of risks. When an event C1 occurs in the MRM performing step S920, a transition to a minimal risk condition (MRC) step S930 may occur. The event C1 may mean that the speed of the subject vehicle is 0, that is, the subject vehicle stops. When an event C2 occurs in the MRM performing step S920, a transition to the ADS standby or ADS off step S940 may occur. The event C2 may mean that the intervention of the driver is made while the MRM is being performed.

In the MRC step S930, the subject vehicle may be in a stop state. In this step, the subject vehicle may perform stop state management, which may refer to vehicle control that maintains the vehicle in a stop state regardless of the slope of the road surface at which the vehicle has stopped. When an event D1 occurs in the MRC step S930, a transition to the ADS standby or ADS off step S940 may occur. The event D1 may mean that, when the driver turns off the ADS, the driver receives the control authority of the vehicle and controls the vehicle.

In the ADS standby or ADS off step S940, the ADS may be ended. In this step, the vehicle may perform the autonomous driving no longer.

The ADS may be in an active state in steps S910, S920, S930, and S950 mentioned above. The ADS may be in an inactive state in step S940.

Figure 10:
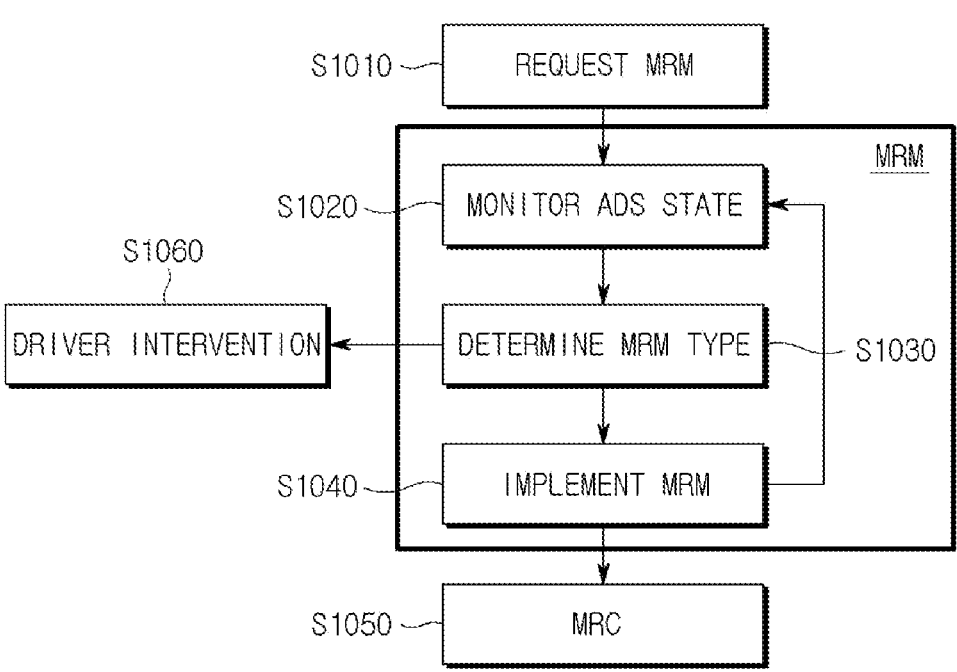
FIG. 10 is a view for describing an MRM step according to the second embodiment of the present disclosure.

FIG. 10 is a view for describing an MRM step according to the second embodiment of the present disclosure.

When a request for the MRM is generated (S1010), the state of the system is monitored (S1020). Specifically, the vehicle analyzes the degree of failure of vehicle components, checks the system impact, determines the state of the system component, and then determines the current performance of the autonomous driving.

Then, the MRM type is determined (S1030). Specifically, the most suitable MRM type may be determined at a point of time when the MRM is implemented. This decision is made based on internal information (e.g., the state of the system or vehicle) and external information (e.g., the degree of congestion of surrounding traffic, ODD). The thus determined MRM type may be transitioned to another MRM type when a specific event occurs.

Then, the MRM implementation is made (S1040). Specifically, the longitudinal control and/or the lateral control of the vehicle is input, and thus the control of the vehicle can be performed.

By the MRM implementation step (S1040), the vehicle may become the MRC state (S1050). Alternatively, the vehicle may return to the ADS state monitoring step (S1020), and then steps S1020, S1030, and S1040 may be repeated. The repeating time may be predetermined by the system. When the intervention of the driver occurs (S1060) while the MRM is being performed, the MRM may be ended.

FIG. 11 is a view for describing the MRM type according to the second embodiment of the present disclosure.

As described above, the MRM type may include first to fifth five types.

The level 1 MRM type is the straight stop in which only the longitudinal deceleration control is performed, and the lateral control is not performed. According to the level 1 MRM type, the lateral control is impossible. For example, the level 1 MRM type may be selected in the case of a lane detection failure, control failure of a lateral actuator (steering), etc. When the MRM is performed according to the level 1 MRM type, the vehicle may deviate from the boundary of a lane or may deviate to the outside of the road. Therefore, the level 1 MRM type may not allow control to accelerate the vehicle.

The level 2 MRM type is the in-lane stop in which both longitudinal deceleration control and lateral control can be performed. The level 2 MRM type can determine a front target vehicle and route by using surrounding information such as sensors, map data, and communication information. The level 2 MRM type may be selected when it is possible to control the lane change but is not possible to drive a distance larger than a predetermined distance.

The level 3 MRM type is the lane change plus stop in traffic lane, in which longitudinal deceleration control and longitudinal acceleration control can be performed and lateral control can also be performed. The level 3 MRM type can determine a front target vehicle and route by using surrounding information such as sensors, map data, and communication information. The level 3 MRM type may be selected when it is not possible to move to a potential stopping area that is out of the flow of traffic. For example, the level 3 MRM type may be selected when the ADS system is operating normally and the potential stopping area cannot be detected or when it is impossible to drive to the potential stopping area by the ADS system due to time and/or system limit. The acceleration control can also be performed for stable lane change. Whether to change lanes or the number of lanes to be changed may be determined according to circumstances.

The level 4 MRM type is the shoulder stop in which longitudinal acceleration control and longitudinal deceleration control can be performed and lateral control can also be performed. The level 4 MRM type can determine a front target vehicle and route by using surrounding information such as sensors, map data, and communication information. The level 4 MRM type may be selected when it is possible to drive to the shoulder of a highway and when there is no obstacle on the shoulder. The acceleration control can also be performed when it is determined that the acceleration control is necessary in light of the flow of traffic to the shoulder.

The level 5 MRM type is the parking lane stop in which longitudinal acceleration control and longitudinal deceleration control can be performed and lateral control can also be performed. The level 5 MRM type can determine a front target vehicle and route by using surrounding information such as sensors, map data, and communication information. The level 5 MRM type may be selected when it is possible to drive to a parking space and when there is no obstacle in the parking space. The acceleration control can also be performed when it is determined that the acceleration control is necessary in light of the flow of traffic to the parking space.

Each of the MRM types described above may be performed within a predetermined execution time. Such execution time may include a minimum execution time and/or a maximum execution time. If the MRM cannot be performed within a predetermined execution time, the MRM type may be transitioned to a low-level type which can be performed immediately.

The state of the vehicle may be monitored in order to determine the MRM type as described above. For example, system performance and limitations may be monitored in real time. Based on such monitoring, the ADS can determine the most appropriate MRM type under a given situation. Specifically, the ADS can monitor whether or not there is a mechanical defect or an electronic defect as an internal state of the vehicle. The ADS can monitor the failure of vehicle components such as sensors and actuators in real-time and continuously. Also, such a state may be monitored when the state of the vehicle is transitioned from the ADS off state to the ADS on state or vice versa. Also, surrounding conditions outside the vehicle may also be monitored in real time and continuously in order to determine the MRM type. For example, the surrounding condition outside the vehicle may include whether the external condition is a highway or a city, whether the condition of a lane is detectable, whether the tire pressure is appropriate, and the like.

The MRM type determined as described above may be transitioned to a high-level or a low-level type. This will be described in detail.

The MRM type may be transitioned to a high-level type. For example, when a low-level MRM type is determined due to a temporary defect or the like and the defect is repaired while performing the MRM, the MRM type may be changed to a higher-level MRM type. The high-level transition of the MRM type may be determined based on state information of the components of the vehicle. Also, the high-level transition of the MRM type may be determined in consideration of the current speed of the vehicle and/or external surrounding information. For example, when the MRM is performed at a level higher than a predetermined level in a low-level MRM type, the MRM type may be maintained as the current low MRM type even though the MRM type can be transitioned to a high-level type. Alternatively, even though the MRM is performed at a predetermined level, the MRM type may be transitioned to a high-level type based on the surrounding information that there is no vehicle around the vehicle of the driver. It is preferable that the MRM type which is changed to a high-level type is transitioned to the highest-level type based on the above-described state information of the components of the vehicle, vehicle speed, surrounding information, and the like.

The MRM type may be transitioned to a low-level type. For example, a high-level MRM type may be changed to a low-level MRM type when defects in a vehicle component occur while the MRM is being performed, when the generated defects are deteriorated, when the lane change is impossible due to a change in traffic conditions, etc. The low-level transition of the MRM type may be determined based on state information of the components of the vehicle. Also, the low-level transition of the MRM type may be determined in consideration of the current speed of the vehicle and/or external surrounding information. For example, when the MRM is performed at a level higher than a predetermined level in a high-level MRM type, the MRM type may be maintained as the current high MRM type even though the MRM type must be transitioned to a low-level type. Alternatively, even though the MRM is performed at a predetermined level, the MRM type may be transitioned to a low-level type based on the surrounding information that there are vehicles around the vehicle of the driver. It is preferable that the MRM type which is changed to a low-level type is transitioned to the highest-level type based on the above-described state information of the components of the vehicle, vehicle speed, surrounding information, and the like.

Specifically, for example, a high-level transition from the level 1 MRM type to the level 2 MRM type is as follows. When a front lane or a front vehicle is not recognized but this recognition problem is solved, the high-level transition can be performed.

The high-level transition from the first or level 2 MRM type to the fourth or level MRM type is as follows. The high-level transition can be performed when an internal condition for performing the higher type is satisfied (e.g., when the controller is reactivated or the speed of the subject vehicle satisfies a predetermined speed (e.g., 60 km/h)), when the external condition for performing the higher type is met (e.g., when a congestion section is resolved), and when an external condition in which the vehicle stops according to a low-level type but the stop position is determined to have a high risk of accident (e.g., the first lane of a highway, on a railroad, a junction, etc.) and an internal condition in which acceleration of the vehicle is possible are satisfied.

The low-level transition from the third, fourth, and level 5 MRM types to the first and level 2 MRM types is as follows. The low-level transition can be performed when an internal condition is not satisfied to perform the high-level type (e.g., a failure of the control device during the performance of the MRM, time-out, or the speed of the subject vehicle is less than or equal to a predetermined speed) and when an external condition for performing the high-level type is not satisfied (e.g., when a congestion section occurs).

Meanwhile, the speed of the subject vehicle, which serves as an MRM operating condition, may vary depending on the MRM type. For example, the level 1 MRM type or the level 2 MRM type may be determined regardless of the speed of the subject vehicle (regardless of whether the speed of the vehicle is low or high). A low-level MRM is performed in the case of the level 1 MRM type and the level 2 MRM type because it is desirable that the MRM is performed in the full range of the speed. The third to level 5 MRM types may be determined only when the speed of the subject vehicle is equal to or greater than a predetermined speed. Here, the required predetermined speed may be a minimum speed required for automatic lane change. That is, a high-level MRM type cannot be determined when the speed of the subject vehicle is less than the predetermined speed because it is desirable to move quickly the vehicle and stop it even though the high-level MRM type (third to level 5 MRM types) is possible as a result of evaluating the internal and external conditions.

As described above, factors determining a predetermined speed for determining the high-level MRM type (third to level 5 MRM types) may include a maximum detection distance of front and rear sensors of the vehicle, a maximum speed limit, and a measurement error. Specifically, the predetermined speed may be determined such that a recognition distance value calculated in consideration of the maximum speed limit and a relative speed measurement error is smaller than the maximum detection distance of the side-rear RADAR.

For example, a recognition longitudinal distance of a vehicle to be a recognition target of in-lane deflection driving function and lane change assistance function is 80 m to 200 m with respect to the front bumper of the subject vehicle. Accordingly, the recognition distance value S critical may be determined as 70 m resulted from the subtraction of 10 m from 80 m. This determination is made in consideration of the whole length of the subject vehicle and the whole length of the target vehicle. When a predetermined speed for determining the MRM is set to 60 km/h, the recognition distance value of 61.68 m is derived by considering the measurement error of 5 km/h for the maximum speed limit of 110 km/h under the domestic law. The recognition distance value (61.68 m) is smaller than m that is the maximum detection distance of the side-rear RADAR. Therefore, as a predetermined speed for determining the MRM, a speed of 60 km/h is suitable.

Also, it is preferable that the deceleration of the subject vehicle is smaller than a predetermined value while performing the MRM. This intends to minimize the possibility of collision with other vehicles without interfering with the flow of traffic. This predetermined deceleration may vary depending on the MRM type, and may be a constant value regardless of the MRM type (e.g., 4 m/s 2).

In addition, the minimal risk maneuver may be canceled due to the intervention of the driver (RTI) or driver's overriding.

Once the minimal risk maneuver is initiated, the minimal risk maneuver may not be canceled except when specific conditions are met. For example, the minimum risk maneuver may not be canceled when the minimum risk maneuver is completed after the minimal risk maneuver is initiated and the vehicle becomes the MRC state, may not be canceled without the operation of the authorized driver. In the embodiment, the authorized driver may include an adult driver registered in the vehicle and/or a driver determined to be in a normal state when there is a driver monitoring camera.

Also, in performing the minimal risk maneuver, if there is an occupant, an alarm may be performed internally/externally. For example, information on the minimal risk maneuver can be displayed internally/externally. If there is no occupant, the alarm may be performed only externally. For example, a hazard warning light may blink.

The autonomous driving system may determine when to initiate the brake control. For example, the autonomous driving system may determine to initiate the brake control after a designated period of time elapses after performing a specific operation. Preferably, it is possible to initiate the brake control in 2.5 seconds after displaying an alarm to the outside such as blinking of a hazard warning light. This intends to prevent a collision with a vehicle behind the vehicle.

Also, in performing the minimal risk maneuver, at least one of the required speed of the subject vehicle, the maximum deceleration, the minimum detection range, the brake control, the acceleration control, the lateral control, the MRC position, and the maximum/minimum execution time may vary depending on the MRM type.

For example, the straight stop as the level 1 MRM type will be described.

In the level 1 MRM type, there is no limit on the required speed of the subject vehicle. That is, regardless of the speed of the subject vehicle, the level 1 MRM type may be determined.

In the level 1 MRM type, the maximum deceleration is preferably 4 m/s$^2$ or less.

Figure 12:
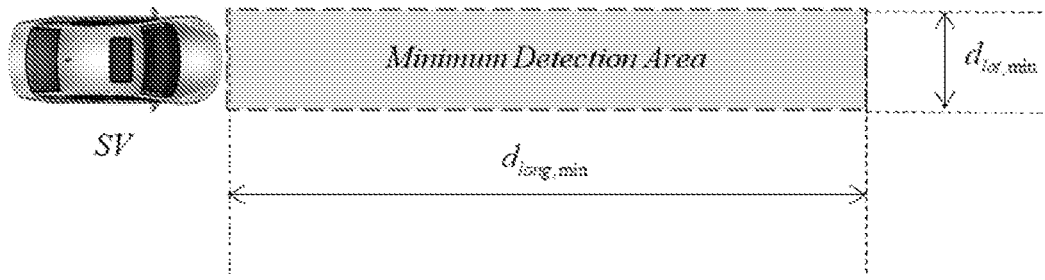
FIG. 12 is a view for describing a minimum detection range according to the second embodiment of the present disclosure.

In the level 1 MRM type, the minimum detection range will be described with reference to FIG. 12. In the level 1 MRM type, it is necessary to detect at least obstacles in the front of the subject vehicle. A minimum detection distance $d_{long,min}$ in the longitudinal direction may be determined as follows based on the maximum deceleration and the speed of the subject vehicle.

$$d_{long,min} = \begin{cases} \dfrac{V_o^2}{2 \cdot a_{max}} & \dfrac{V_o^2}{2 \cdot a_{max}} > 10 \\ 10 & \text{otherwise} \end{cases}$$

Also, the minimum detection distance $d_{lat,min}$ in the lateral direction may be determined to be the same as the width of the subject vehicle.

It is preferable that the minimum detection range according to the MRM type should be set wider as the MRM type is higher. This is because the more the type and number of usable sensors increase as the level of the MRM type is higher, and this is because it is preferable for safety that a minimum detection area should be set wider as the level of the MRM type is higher.

Alternatively, the minimum detection range according to the MRM type may be set wider as the level of the MRM type is lower. This is because the lower the level of the MRM type, the higher the risk of collision with nearby vehicles since it is necessary to set the wider minimum detection area as the level of the MRM type is lower.

In the brake control of the level 1 MRM type, when a detectable distance is less than the minimum detection distance or when the detection is not possible, the brake control using the maximum deceleration can be made. However, if an obstacle within the minimum detection distance can be detected, the brake can be controlled at a deceleration lower than the maximum deceleration. That is, in the level 1 MRM type, since there is a possibility that the vehicle crosses the lane, it is preferable to allow the maximum deceleration. For example, in the level 1 MRM type, the maximum deceleration can be made when it is impossible to detect the surroundings, when a collision with the rear is not expected in case of a sudden stop, when a road is curved, when an obstacle in front is detected within a certain distance, etc. However, as will be described later, in the level 2 MRM type, it is preferable to decelerate at a deceleration lower than the maximum deceleration.

In the level 1 MRM type, the lateral control is not performed. Also, the lateral control is not performed, and the MRC position may deviate from the lane boundary.

In the level 1 MRM type, the minimum/maximum execution time are as follows. The minimum execution time may be longer than the time that the subject vehicle takes from a point of time when the MRM is initiated to a point of time when the MRM is ended in a flat land condition by using a constant maximum deceleration. The maximum execution time may be shorter than the time that the subject vehicle takes from a point of time when the MRM is initiated to a point of time when the MRM is ended, in a flat land condition by using a neutral gear. For example, the maximum execution time may be the time that the subject vehicle takes from a point of time when the MRM is initiated to a point of time when the subject vehicle stops, in a flat land condition by using a neutral gear, or may be shorter.

For another example, the in-lane stop as the level 2 MRM type will be described. In the case of the level 2 MRM type, there is no limit on the required speed of the subject vehicle. That is, regardless of the speed of the subject vehicle, the level 2 MRM type may be determined.

In the level 2 MRM type, the maximum deceleration is preferably 4 m/s² or less.

Figure 13:
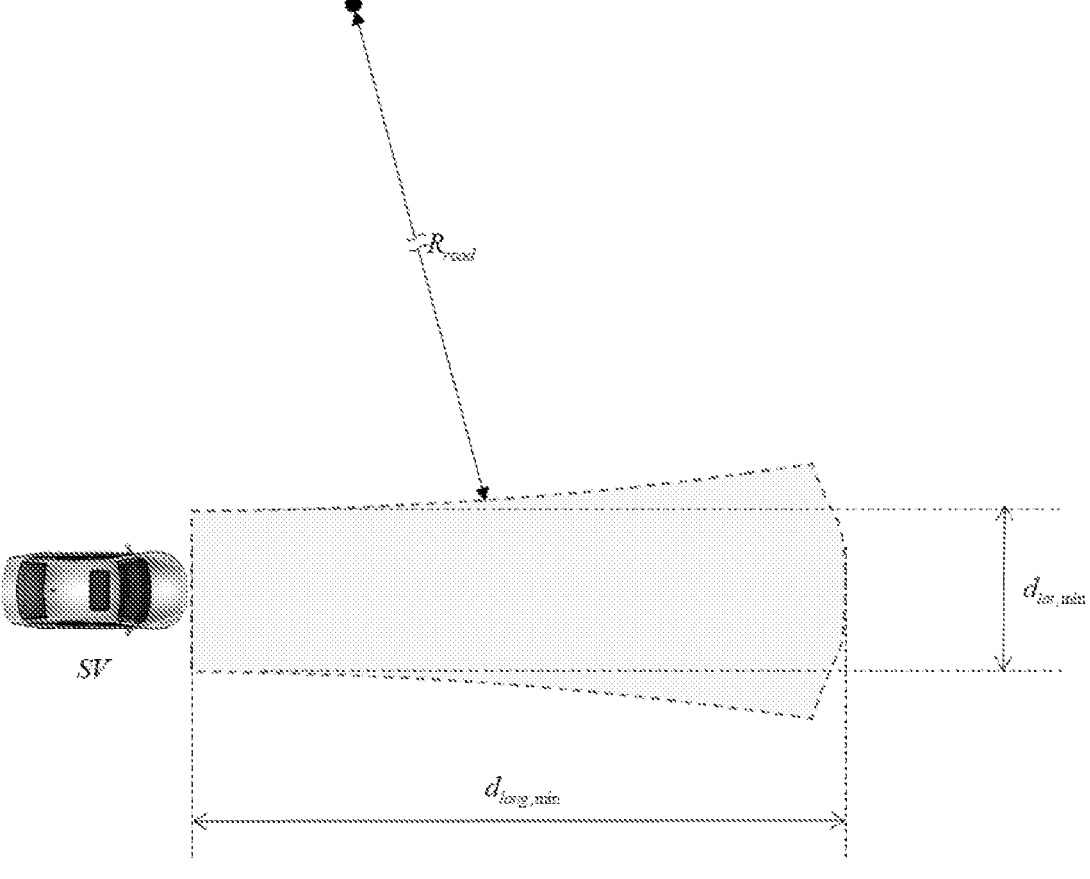
FIG. 13 is a view for describing the minimum detection range according to the second embodiment of the present disclosure.

In the level 2 MRM type, the minimum detection range will be described with reference to FIG. 13. In the level 2 MRM type, it is necessary to detect at least obstacles which are in the front of the subject vehicle and within the same lane. The minimum detection distance $d_{long,min}$ in the longitudinal direction may be determined as follows based on the maximum deceleration and the speed of the subject vehicle.

$$d_{long,min} = \begin{cases} \dfrac{V_o^2}{2 \cdot a_{max}} & \dfrac{V_o^2}{2 \cdot a_{max}} > 10 \\ 10 & \text{otherwise} \end{cases}$$

Also, in the in-lane stop, in consideration of a case where the lane is curved, the detection range should cover even a curvature of 500 m.

$$R_{road,min}[m] = 500$$

Also, the minimum detection distance $d_{lat,min}$ in the lateral direction may be determined to be the same as the lane width in consideration of the curvature.

It is preferable that the minimum detection range according to the MRM type should be set wider as the MRM type is higher. This is because the more the type and number of usable sensors increase as the level of the MRM type is higher, and this is because it is preferable for safety that a minimum detection area should be set wider as the level of the MRM type is higher.

Alternatively, the minimum detection range according to the MRM type may be set wider as the level of the MRM type is lower. This is because the lower the level of MRM type, the higher the risk of collision with nearby vehicles since it is necessary to set the wider minimum detection area as the level of the MRM type is lower.

In the brake control of the level 2 MRM type, when a detectable distance is less than the minimum detection distance or when the detection is not possible, the brake control using the maximum deceleration can be made. However, if an obstacle within the minimum detection distance can be detected, the brake can be controlled at a deceleration lower than the maximum deceleration.

In the level 2 MRM type, the lateral control may be performed within a range in which the subject vehicle can be maintained within the same lane.

In the level 2 MRM type, the minimum/maximum execution time are as follows. The minimum execution time may be longer than the time that the subject vehicle takes from a point of time when the MRM is initiated to a point of time when the MRM is ended in a flat land condition by using a constant maximum deceleration. The maximum execution time may be shorter than the time that the subject vehicle takes from a point of time when the MRM is initiated to a point of time when the MRM is ended, in a flat land condition by using a neutral gear.

FIG. 14 is a flowchart showing a method for selecting a type of a minimal risk maneuver according to a third embodiment of the present disclosure. Referring to FIG. 14, the vehicle 100 may determine a failure state (S210). According to the embodiments, the vehicle 100 may determine the failure state by using the controller 120 or by using a response from the components of the vehicle 100. Here, the failure state includes whether or not the autonomous driving system is in a state capable of controlling the vehicle. For example, the failure state of brakes, steering, sensors, etc., may mean a state in which the autonomous driving system (ADS) cannot control them.

The vehicle 100 may determine whether the deceleration and acceleration functions of the vehicle 100 are possible (S220). According to the embodiments, the vehicle 100 may determine whether a driving unit, for example, an engine of the vehicle 100, an accelerator pedal, a brake, and components related to them operate normally.

When the deceleration and acceleration functions of the vehicle 100 are possible ("Yes" in step S220), the vehicle 100 may determine whether the steering function of the vehicle 100 is possible (S230). According to the embodiments, the vehicle 100 may determine whether a steering wheel of the vehicle 100 and components related to the steering wheel operate normally.

When the steering function of the vehicle 100 is not possible ("No" in step S230), the vehicle 100 may perform the straight stop as the minimal risk maneuver. That is, if only the deceleration and acceleration functions of the vehicle 100 are possible, the vehicle 100 performs the straight stop as the minimal risk maneuver.

When the steering function of the vehicle 100 is possible ("Yes" in step S230), the vehicle 100 may determine whether road condition detection is possible (S250). According to the embodiments, the vehicle 100 may determine whether the sensor 110 and components related thereto operate normally.

When the road condition detection function of the vehicle 100 is not possible ("No" in step S250), the vehicle 100 may perform the straight stop or the current lane stop as the minimal risk maneuver (S260). That is, when the deceleration and acceleration functions and the steering function of the vehicle 100 are possible and the road condition detection is not possible, the vehicle 100 may perform the straight stop or may perform the current lane stop, as the minimal risk maneuver.

According to the embodiments, the vehicle 100 may travel along a lane by using the steering function and stop within the lane by using the deceleration and acceleration function.

When the road condition detection function of the vehicle 100 is possible ("Yes" in step S250), the vehicle 100 may perform the straight stop, the current lane stop, or the out-of-lane stop, as the minimal risk maneuver (S270). That is, when the deceleration and acceleration functions, the steering function, and the road condition detection function of the vehicle 100 are all possible, the vehicle 100 may perform the straight stop, may perform the current lane stop, or may perform the out-of-lane stop, as the minimal risk maneuver. The out-of-lane stop may include the adjacent lane stop and the shoulder stop.

According to the embodiments, the vehicle 100 may detect the front, rear, left and right states of the vehicle 100 by using the road condition detection function, may change a lane by using the steering function according to the detection result, and may stop outside the lane by using the deceleration and acceleration functions. For example, the vehicle 100 sets a region of interest including the vicinity of the vehicle 100, thereby detecting the front, rear, left, and right states of the vehicle 100. The shape of the region of interest may include various shapes such as a circle, an ellipse, a quadrangle, and a triangle, etc.

Figure 15:
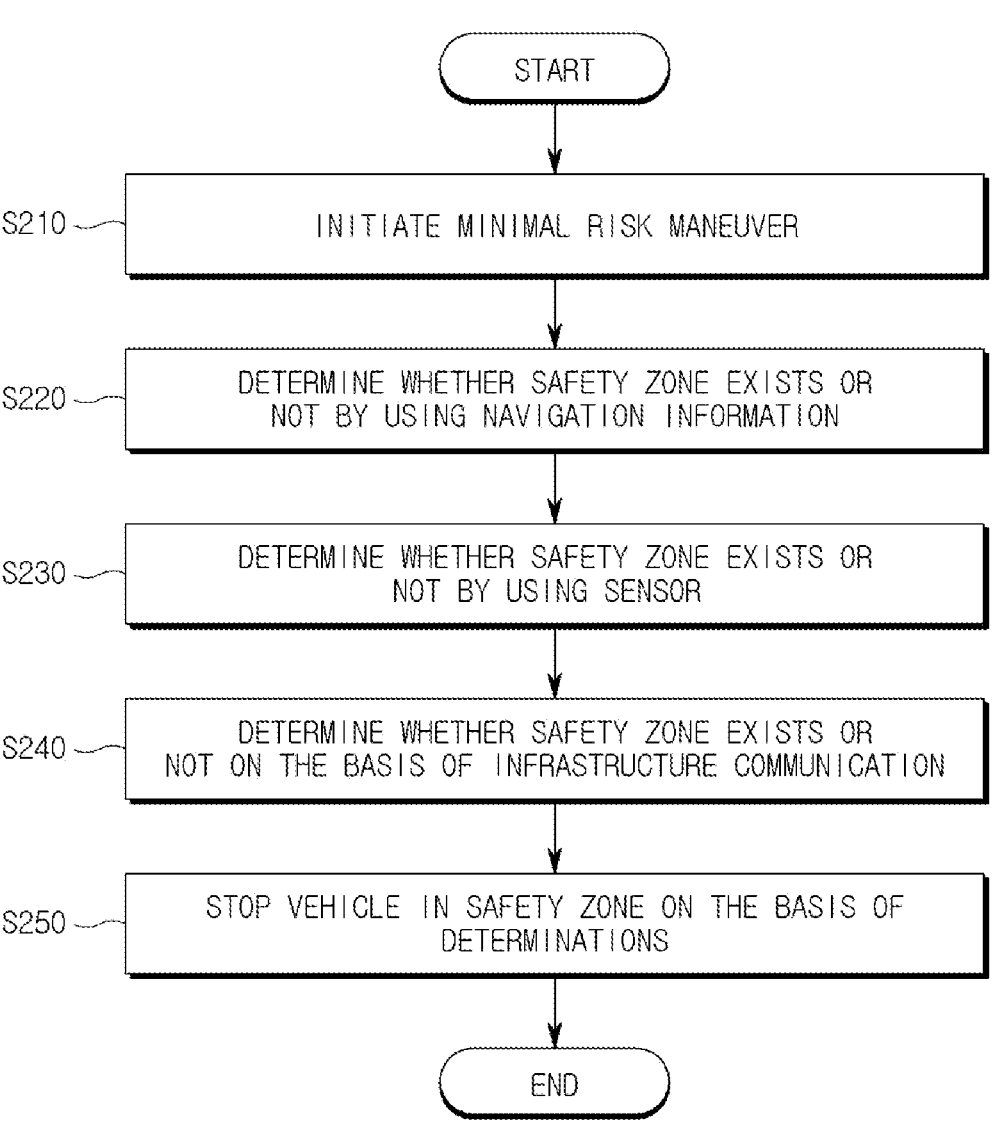
FIG. 15 is a flowchart showing a safety zone stop motion according to a minimal risk maneuver according to a fourth embodiment of the present disclosure.

FIG. 15 is a flowchart showing a safety zone stop motion according to the minimal risk maneuver according to a fourth embodiment of the present disclosure. Referring to FIG. 15, the vehicle 100 may stop in a safety zone when performing the minimal risk maneuver. In the present specification, the safety zone means a zone in which the vehicle 100 can safely stop among zones on the road, and may mean, for example, a rest stop, a shoulder, or a variable lane that is not in use.

The vehicle 100 may initiate the minimal risk maneuver (S210). According to the embodiments, the vehicle 100 may initiate the minimal risk maneuver in response to a request for the minimal risk maneuver.

The vehicle 100 may determine whether the safety zone exists or not by using navigation information (S220). According to the embodiments, the vehicle 100 may determine whether or not the safety zone exists on the road around the vehicle 100 by using the current position of the vehicle 100 and navigation information. The navigation information may be stored in a memory of the vehicle 100 or may be received through a network.

For example, the vehicle 100 may determine whether or not there is a safety zone located in the vicinity of the current position of the vehicle 100 based on the navigation information.

The vehicle 100 may determine whether the safety zone exists or not by using the sensor 110 (S230). According to the embodiments, the vehicle 100 obtains a video or an image of the surroundings of the vehicle 100 by using at least one of a camera, a LIDAR sensor, and a RADAR sensor, and analyzes the video or image, thereby determining whether or not the safety zone exists in the vicinity of the vehicle 100. For example, the vehicle 100 may recognize a sign around the vehicle 100 and determine whether the recognized sign indicates that there is a safety zone.

The vehicle 100 may determine whether a safety zone exists or not by using infrastructure communication (S240). According to the embodiments, the vehicle 100 may obtain information on the safety zone located in the vicinity of the vehicle 100 from the infrastructure, and determine whether the safety zone exists in the vicinity of the vehicle 100 from the information. For example, the vehicle 100 may provide the current position of the vehicle 100 to the infrastructure, and may receive the information on the safety zone located in the vicinity of the vehicle 100 from the infrastructure.

The vehicle 100 may stop in a safety zone based on the determinations S220 to S240 (S250). According to the embodiments, when there exists a common safety zone indicated by each of the determinations S220 to S240, the vehicle 100 may stop in the common safety zone. For example, when a first safety zone determined based on the navigation information, a second safety zone determined by using a sensor, and a third safety zone determined based on the information from the infrastructure are all the same or located adjacent to each other, the vehicle 100 determines that there is a safety zone, and travels to the common safety zone and stops.

When the common safety zone indicated by each of the determinations S220 to S240 does not exist, the vehicle 100 may determine that there is no safety zone and continue to travel without stopping.

Also, according to the embodiments, in a case where some of the determinations S220 to S240 are not performed (e.g., due to a failure), when there exists the common safety zone indicated by the performed determinations, the vehicle 100 may stop in the common safety zone. For example, in a case where the information is not received from the infrastructure, when the first safety zone determined based on the navigation information and the second safety zone determined by using a sensor are all the same or located adjacent to each other, the vehicle 100 determines that the safety zone exists, and travels to the common safety zone and stops. That is, the vehicle 100 may determine that the safety zone exists based on whether the safety zones determined by the performed determinations are common or not.

Figure 16:
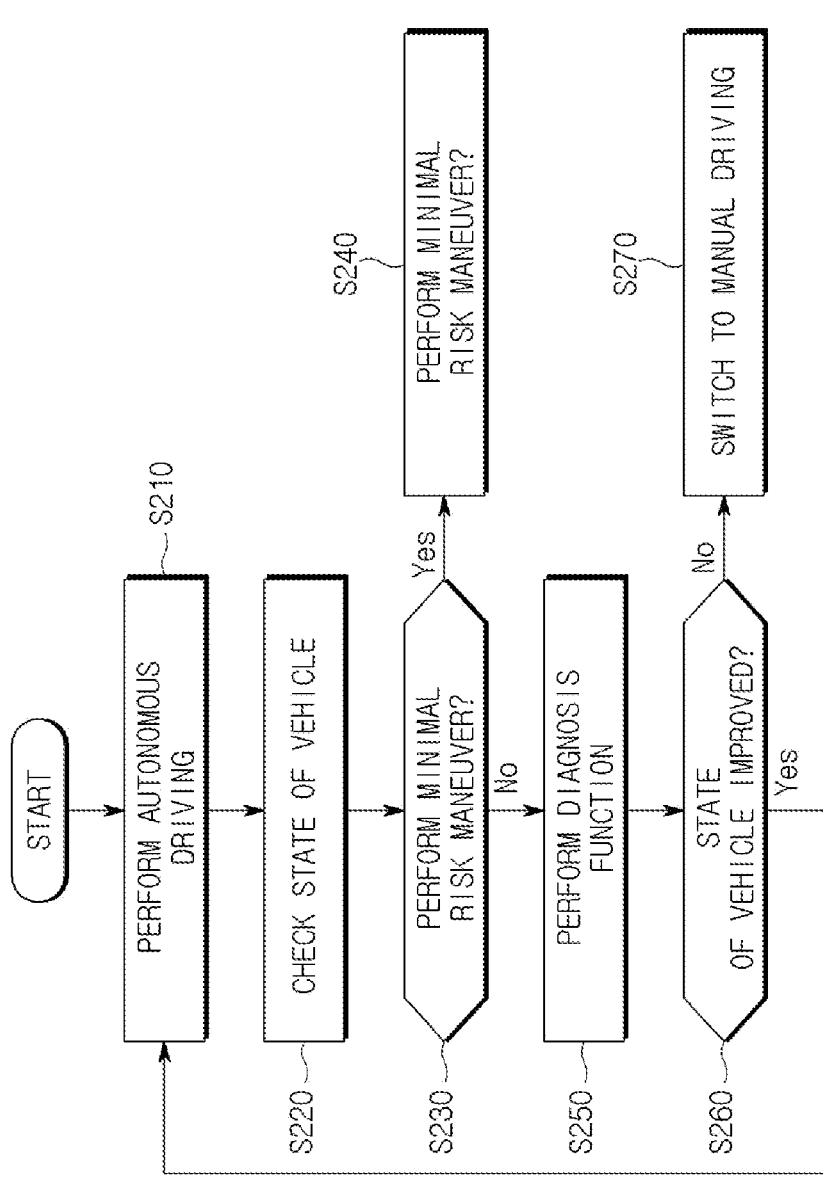
FIG. 16 is a flowchart showing emergency assessment and emergency handling according to a fifth embodiment of the present disclosure.

FIG. 16 is a flowchart showing emergency assessment and emergency handling according to a fifth embodiment of the present disclosure. Referring to FIG. 16, the vehicle 100 performs the autonomous driving (S210).

The vehicle 100 may check the state of the vehicle 100 (S220). According to the embodiments, the vehicle 100 may check the state of each component and functions thereof.

The vehicle 100 may check the state of the hardware configuration and the software configuration of the vehicle 100. According to the embodiments, the vehicle 100 may determine whether a failure occurs in the components and functions of the vehicle 100 and the position of the failure. For example, the vehicle 100 may determine whether a failure occurs in the sensor 110 and the position of the failure, whether driving functions of the vehicle such as a steering function, a deceleration function, an acceleration function, a brake, etc., are in failure, whether the autonomous driving is possible, whether an object recognition function is in failure or not, whether an external impact exists, whether damage occurs, etc.

The vehicle 100 may determine whether to perform the minimal risk maneuver (S230). According to the embodiments, the vehicle 100 may determine whether to perform the minimal risk maneuver based on the determined state of the vehicle 100. For example, based on at least one of the number of failed parts of the vehicle 100 (i.e., failed components and failed functions), the position of the failed parts, and the type of the failed parts, the vehicle 100 may calculate the severity of the current state of the vehicle 100, and may determine whether to perform the minimal risk maneuver based on the calculated severity.

When it is determined to perform the minimal risk maneuver ("Yes" in step S230), the vehicle 100 may perform the minimal risk maneuver (S240). According to the embodiments, the vehicle 100 may calculate the severity of the vehicle 100 based on the determined state of the vehicle 100, and when the calculated severity exceeds a predetermined degree, the vehicle 100 may perform the minimal risk maneuver, and, when the calculated severity does not exceed the predetermined degree, the vehicle 100 may not perform the minimal risk maneuver.

When it is determined that the vehicle 100 does not perform the minimal risk maneuver ("No" in step S230), the vehicle 100 may perform a diagnosis function (S250). According to the embodiments, the diagnosis function performs a self-diagnosis on the components and functions of the vehicle 100, and some problems of the components and functions may be solved (or cured) through the diagnosis function. The diagnosis function may be performed by the processor 130.

According to the embodiments of the present application, when the state of the vehicle 100 is not serious, the diagnosis function may be performed without performing the minimal risk maneuver. Through this, it is possible not only to accurately determine the initiation condition of the minimal risk maneuver, but also to prevent unnecessary initiation of the minimal risk maneuver, thereby increasing the stability of the vehicle 100.

The vehicle 100 may determine whether the state of the vehicle is improved (S260). According to the embodiments, the vehicle 100 may determine whether the failure or problem of the components and functions of the vehicle 100 is resolved. For example, the vehicle 100 may check the state of the vehicle 100 once more.

When the state of the vehicle 100 is improved ("Yes" in step S260), the vehicle 100 may perform the autonomous driving. That is, when the problem is resolved, the vehicle 100 may resume the autonomous driving.

When the state of the vehicle 100 is not improved ("No" in step S260), the vehicle 100 may be switched to the manual driving (S270). According to the embodiments, the vehicle 100 may be switched to the manual driving when there is a failure in the vehicle 100 even if the diagnosis function is performed. For example, if a problem of the autonomous driving function is not resolved, the vehicle 100 may perform manual driving by transferring the control authority to the driver instead of continuously maintaining the autonomous driving.

According to the embodiments, when the state of the vehicle 100 is not improved, the vehicle 100 may transmit a signal indicating a failure of the vehicle 100. For example, the vehicle 100 may transmit a signal indicating the failure of the vehicle 100 to a predetermined management center (or server).

Figure 17:
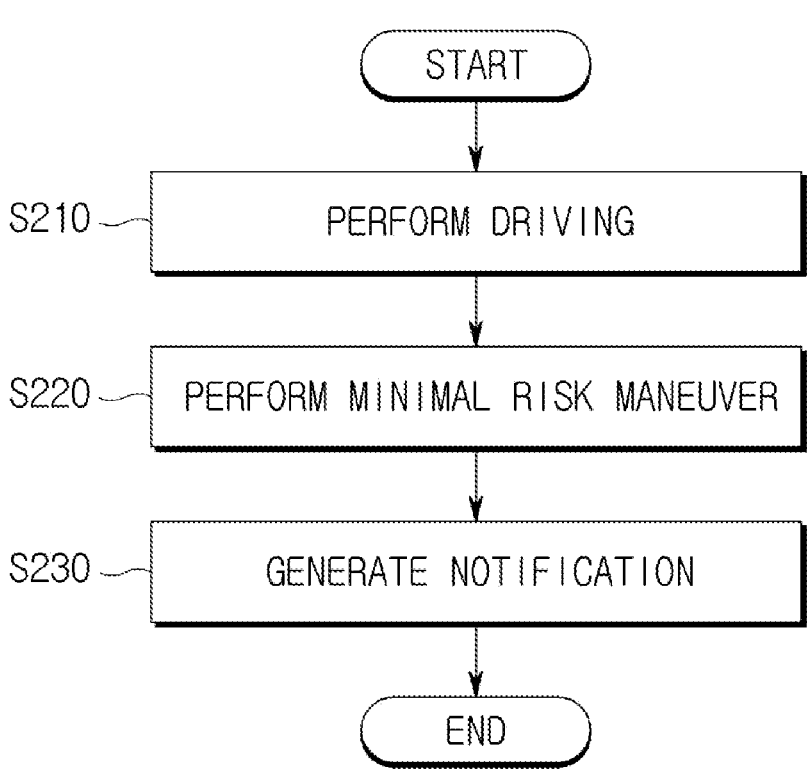
FIG. 17 is a flowchart showing a method for generating a notification according to a minimal risk maneuver according to a sixth embodiment of the present disclosure.

FIG. 17 is a flowchart showing a method for generating a notification according to a minimal risk maneuver according to a sixth embodiment of the present disclosure. Referring to FIG. 17, the vehicle 100 may perform driving (S210). According to the embodiments, the vehicle 100 may performing driving according to the autonomous driving or the manual driving.

The vehicle 100 may perform the minimal risk maneuver (S220). According to the embodiments, when a request for the minimal risk maneuver is generated while the vehicle is traveling, the vehicle 100 may perform the minimal risk maneuver in response to the request.

The minimal risk maneuver is performed, and the vehicle 100 may generate a notification (S230). According to the embodiments, the vehicle 100 may generate a notification related to the minimal risk maneuver.

The vehicle 100 may provide a notification of the performance of the minimal risk maneuver to the surrounding vehicle or surrounding facilities (e.g., infrastructure, police station, fire station, hospital, etc.). According to the embodiments, the vehicle 100 may set an area in a certain range around the vehicle 100 and provide the notification to other vehicles or facilities included in the area.

The vehicle 100 may provide the notification by transmitting a signal including specific information or by using a visual means and an audio means. For example, the vehicle 100 may provide the notification by transmitting a signal including information on the minimal risk maneuver, by turning on/off a hazard warning light, or by blowing a horn.

According to the embodiments, the information on the minimal risk maneuver may include information on whether the minimal risk maneuver is performed, a point of time when the minimal risk maneuver is performed, and the type, position, and state of the vehicle 100 which has performed the minimal risk maneuver, without being limited thereto, and may include various information on the minimal risk maneuver.

Figure 18:
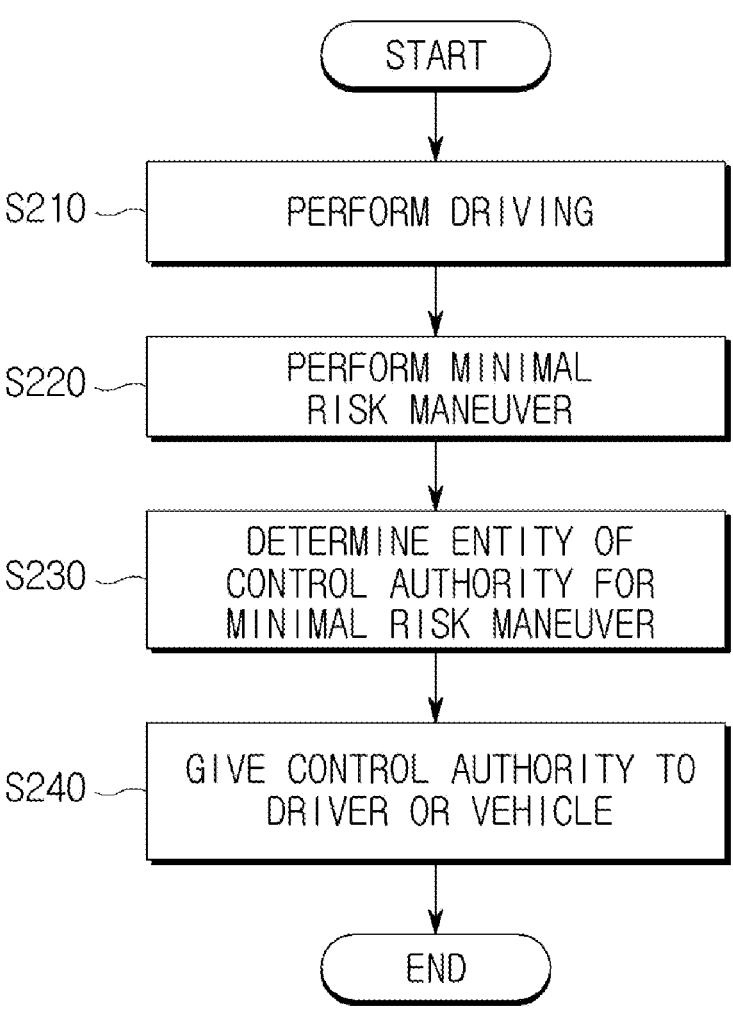
FIG. 18 is a flowchart showing a method for giving control authority according to a seventh embodiment of the present disclosure.

FIG. 18 is a flowchart showing a method for giving control authority according to a seventh embodiment of the present disclosure. Referring to FIG. 18, the vehicle 100 may perform driving (S210). According to the embodiments, the vehicle 100 may performing driving according to the autonomous driving or the manual driving.

The vehicle 100 may perform the minimal risk maneuver (S220). According to the embodiments, when a request for the minimal risk maneuver is generated while the vehicle is traveling, the vehicle 100 may perform the minimal risk maneuver in response to the request.

The vehicle 100 may determine an entity of the control authority for the minimal risk maneuver (S230). According to the embodiments, the vehicle 100 may determine whether to give the control authority of the minimal risk maneuver to the vehicle 100 or to the driver. In the present disclosure, the control authority refers to the authority to control the minimal risk maneuver, and the subject having the authority may perform control according to the minimal risk maneuver.

The vehicle 100 may determine an entity of the control authority based on a cause that requires the minimal risk maneuver. As described above, when a specific event (e.g., risk) occurs for the vehicle 100, a request for the minimal risk maneuver may be generated. The vehicle 100 can determine the entity of the control authority based on the characteristics of the event which requests the minimal risk maneuver.

According to the embodiments, when the request for the minimal risk maneuver is generated by the driver, the vehicle 100 may determine the entity of the control authority for the minimal risk maneuver as the driver. For example, when a cause of the failure is the driver (e.g., inexperienced driving, etc.), the vehicle 100 may determine the entity of the control authority for the minimal risk maneuver as the driver. If the cause of the request for the minimal risk maneuver is the driver, the autonomous driving system may not transfer the control authority to the driver even though the driver intervenes. The autonomous driving system can continue to perform the minimal risk maneuver even though the driver intervenes.

According to the embodiments, when the request for the minimal risk maneuver is generated by the vehicle 100, the vehicle 100 may determine the entity of the control authority for the minimal risk maneuver as the vehicle 100. For example, when the cause of the failure is the vehicle 100 (e.g., the failure of the sensor 110 or failure of the function, etc.), the vehicle 100 may determine the entity of the control authority for the minimal risk maneuver as the vehicle 100.

The vehicle 100 may give the control authority to the vehicle 100 or the driver based on the result of determining the entity of the control authority (S240). According to the embodiments, when the entity of the control authority is the vehicle 100, the minimal risk maneuver may be performed by the vehicle 100, and when the entity of the control authority is the driver, the minimal risk maneuver may be performed by the driver.

When it is determined that the entity of the control authority is the vehicle 100, the vehicle 100 may perform the minimal risk maneuver until the minimum risk condition is fulfilled. According to the embodiments, even though the control of the driver intervenes before the minimum risk condition is fulfilled, the vehicle 100 may perform the minimal risk maneuver without transferring the control authority. For example, when it is determined that the entity of the control authority is the vehicle 100, even though steering, braking, or acceleration is performed by the driver, the minimal risk maneuver may be continuously performed by the vehicle 100.

When it is determined that the entity of the control authority is the driver, the vehicle 100 may transfer the control authority for the minimal risk maneuver to the driver when the driver operates. According to the embodiments, when the driver operates while the minimal risk maneuver is being performed, the vehicle 100 may stop the minimal risk maneuver and may be controlled according to the operation of the driver. For example, when steering, braking, or acceleration is performed by the driver, the minimal risk maneuver by the vehicle 100 may be stopped, and the vehicle 100 may be controlled according to the operation of the driver.

According to the present disclosure, since the entity of the control authority for the minimal risk maneuver can be determined, damage due to the uncertainty of the control authority in an emergency situation can be prevented, and the stability of the vehicle during the minimal risk maneuver can be increased through the control by the determined entity.

The operating methods of the vehicle according to the present disclosure may be implemented with instructions which are stored in a computer-readable storage medium and can be executed by a processor.

Directly and/or indirectly and regardless of whether the storage media is in a raw state, in a formatted state, an organized state, or in any other accessible state, the storage media may include a relational database, a non-relational database, an in-memory database, and a database which can store a data and include a distributed type database, such as other suitable databases that allows access to the data through a storage controller. In addition, the storage medium includes a primary storage device, a secondary storage device, a tertiary storage device, an offline storage device, a volatile storage device, a nonvolatile storage device, a semiconductor storage device, a magnetic storage device, an optical storage device, and a flash storage device, a hard disk drive storage device, a floppy disk drive, a magnetic tape, or any type of storage device such as other suitable data storage medium.

In this specification, the instruction may be one of include assembler instructions, instruction-set-architecture (ISA) instructions, machine instructions, machine-dependent instructions, microcode, firmware instructions, state setting data, and source codes or object codes written in any combination of one or more programming languages including an object-oriented programming language such as Smalltalk, C++, etc., and a conventional procedural programming language such as a "C" programming language or similar programming languages.

Although the present invention has been described with reference to the embodiment shown in the drawings, this is just an example and it will be understood by those skilled in the art that various modifications and equivalent thereto may be made. Therefore, the true technical scope of the present invention should be determined by the spirit of the appended claims.

The invention claimed is:

1. A vehicle for performing a minimal risk maneuver (MRM), the vehicle comprising:

a sensor which senses an environment around the vehicle and generates data related to the environment;

a processor which monitors a state of the vehicle to generate data related to the state of the vehicle, and controls autonomous driving of the vehicle;

a controller which controls operations of the vehicle according to the control of the processor;

a navigation system which transmits and receives navigation information of the vehicle; and an infrastructure communication circuit which transmits and receives infrastructure communication information to and from external infrastructures, wherein the processor generates a request for the minimal risk maneuver of the vehicle, determines an MRM safety zone based on at least one of a first safety zone determined based on using a current position of the vehicle and the navigation information, a second safety zone determined based on analyzing information of the sensor, and a third safety zone obtained from the infrastructure communication information wherein the MRM safety zone is a zone where the vehicle targets to stop for the minimal risk maneuver, determines a common safety zone as the MRM safety zone based on at least two of the first safety zone, the second safety zone, and the third safety zone being located adjacent to each other, and controls the controller to perform the minimal risk maneuver based on whether the common safety zone exists or not.

2. The vehicle of claim 1, wherein the processor determines any one of a plurality of types as a minimal risk maneuver type based on the state of the vehicle and the MRM safety zone, and controls the controller to perform the minimal risk maneu-
ver in accordance with contents of the minimal risk
maneuver type.

3. The vehicle of claim 2, wherein the plurality of types comprises:

moving to the MRM safety zone; and continuing a driving.

4. The vehicle of claim 3, wherein, when it is determined that the vehicle is able to move to the MRM safety zone, the processor determines moving to the MRM safety zone as the minimal risk maneuver type.

5. The vehicle of claim 3, wherein, when it is determined that there is no MRM safety zone or the vehicle is not able to move the MRM safety zone, the processor determines the continuing the driving as the minimal risk maneuver type.

6. The vehicle of claim 1, wherein each of the first safety zone, the second safety zone, and the third safety zone comprises a rest stop, a shoulder, a variable lane that is not in use, or no safety zone.

7. A method for operating a vehicle for performing a minimal risk maneuver (MRM), the method comprising:

an MRM step of performing the minimal risk maneuver according to a request for the minimal risk maneuver by the vehicle; and an MRC step of completing the minimal risk maneuver and performing a stop state management of the vehicle, wherein the MRM step comprises:

determining an MRM safety zone based on at least one of a first safety zone determined based on using a current position of the vehicle and navigation information, a second safety zone determined based on analyzing information of a sensor, and a third safety zone obtained from infrastructure communication information, wherein the MRM safety zone is a zone where the vehicle targets to stop for the minimal risk maneuver;

determining a common safety zone as the MRM safety zone based on at least two of the first safety zone, the second safety zone, and the third safety zone being located adjacent to each other; and performing the minimal risk maneuver based on whether the common safety zone exists or not.

8. The method of claim 7, wherein the MRM step comprises:

monitoring a state of the vehicle;

determining any one of a plurality of types as a minimal risk maneuver type based on the state of the vehicle and the MRM safety zone; and perform the minimal risk maneuver in accordance with contents of the minimal risk maneuver type.

9. The method of claim 8, wherein the plurality of types comprises:

moving to the MRM safety zone; and continuing a driving.

10. The method of claim 9, wherein, when it is determined that the vehicle is able to move to the MRM safety zone, the determining the minimal risk maneuver type comprises determining moving to the MRM safety zone as the minimal risk maneuver type.

11. The method of claim 9, wherein, when it is determined that there is no MRM safety zone or the vehicle is not able to move the MRM safety zone, the determining the minimal risk maneuver type includes determining the continuing the driving as the minimal risk maneuver type.

12. The method of claim 7, wherein each of the first safety zone, the second safety zone, and the third safety zone comprises a rest stop, a shoulder, a variable lane that is not in use, or no safety zone.

\* \* \* \* \*